(12) United States Patent
Kato et al.

(10) Patent No.: US 6,233,255 B1
(45) Date of Patent: *May 15, 2001

(54) APPARATUS AND METHOD FOR REMULTIPLEXING AND CODING MULTIMEDIA INFORMATION

(75) Inventors: Yoshiaki Kato; Yuka Fujita; Tokumichi Murakami, all of Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/808,665

(22) Filed: Feb. 28, 1997

(30) Foreign Application Priority Data

Jul. 24, 1996 (JP) ................................................ 8-194964

(51) Int. Cl.[7] ........................................................ H04J 1/00
(52) U.S. Cl. ...................... 370/486; 370/537; 348/423.1
(58) Field of Search ............................. 370/522, 537, 370/538, 389, 486, 487, 476, 490, 395, 477, 394, 517, 474; 348/7, 423.1; 455/3.1, 6.3, 4.2

(56) References Cited

U.S. PATENT DOCUMENTS 5,691,986 * 11/1997 Pearlstein ............................. 370/477
5,835,493 * 11/1998 Magee et al. ........................ 370/394

FOREIGN PATENT DOCUMENTS 2172474 9/1986 (GB) .
2172476 9/1986 (GB) .
2172478 9/1986 (GB) .

* cited by examiner

Primary Examiner—Valencia Martin-Wallace
Assistant Examiner—Kim T. Nguyen

(57) ABSTRACT

The remultiplexing apparatus includes a control information selector that selects a packet containing program control information from the inputted bit stream, a program control information editor that edits contents of the selected program control information and generates new program control information corresponding to an outputted bit stream, and a remultiplexer for multiplexing again the packet containing media information in the inputted bit stream and the program control information generated by the program control information editor.

20 Claims, 18 Drawing Sheets

FIG.15

| PID-aM | PROGRAM-SPECIFIC CONTROL INFORMATION (PROGRAM-a) |

```
...                                                          ~109
INFORMATION FOR PACKET ID NUMBERS
     VIDEO PACKET=                      PID-aV
     AURAL PACKET=                      PID-aA
     INFORMATION PACKET=                PID-aD
     PACKET WITH CLOCK INFORMATION=     PID-aC

| PID-P | ALL-PROGRAM CONTROL INFORMATION |

```
INFORMATION OF PROGRAM-a                                     ~111
  PACKET ID NO. OF PROGRAM-SPECIFIC CONTROL INFORMATION=PID-aM
...
INFORMATION OF PROGRAM-b
  PACKET ID NO. OF PROGRAM-SPECIFIC CONTROL INFORMATION=PID-bM
...
INFORMATION OF PROGRAM-n
  PACKET ID NO. OF PROGRAM-SPECIFIC CONTROL INFORMATION=PID-nM
...
...
```

APPARATUS AND METHOD FOR REMULTIPLEXING AND CODING MULTIMEDIA INFORMATION

FIELD OF THE INVENTION

The present invention relates to an apparatus for coding and multiplexing multimedia information such as, digitalized video signals, aural signals, and other information, and transmitting the information or accumulating the information therein. Specific examples that the present invention can be applied to include a digital broadcasting system, a video on demand, a community antenna television system, and a video conference system or the like with a transmission path such as a satellite and a ground wave, a coaxial cable, and an optical fiber.

BACKGROUND OF THE INVENTION

FIG. 13 is a block diagram showing a transport stream (described as TS herein after) multiplexing transmission device for multiplexing and transmitting information as a transport stream which is an example of a multiplexed bit stream disclosed in, for instance, "Image and information engineering and broadcasting technology" issued by Institute of Television Engineers of Japan, Vol. 49, No. 4, (Whole Number 560), special number MPEG "3-4 system" (April, 1995 number thereof).

In FIG. 13, designated at the reference numeral 1 is a clock generating section, at 2 a video coding section, at 3 an aural coding section, at 4 a information coding section, at 5 a program-specific information generating section, at 6 a media multiplexing section, at 7a, 7b . . . 7n a program generating section respectively, at 8 an all program control information generating section, and at 9 a program multiplexing section.

Next description is made for a method of generating a program-a in the program generating section 7a of the TS multiplexing transmission device as operations of an example thereof based on the conventional technology. A video signal 102, an aural signal 103, various information signals 104 are coded as a information source in the video coding section 2, the aural coding section 3, and the information coding section 4 respectively, so that video coded information 106, aural coded information 107, information coded information 108 can be obtained. The inputted coded information is contained in packets which are multiplexed as a bit stream by the media multiplexing section 6.

Description is made herein for a transport stream packet (described as a TS packet hereinafter) with a fixed length comprising 188 bytes as an example of packetizing. FIG. 14 shows configuration of a TS packet, in the figure, designated at the reference numeral at 113 is a packet header with a 4-byte length, at 114 a packet ID number (described as a PID number hereinafter), and at 115 packet information with a 184-byte length. The video coded information 106, aural coded information 107, and information coded information 108 each coded according to the information source are putted into packet information 115 of the TS packet which has different PID numbers 114 respectively. As an example herein, it is assumed that the video coded information 106 is transmitted with a packet having a PID number of PID-aV, the aural coded information 107 with a packet having a PID number of PID-aA, and the information coded information 108 with a packet having a PID number of PID-aD. On the other hand, the coded information in the packet information 115 is identified as each of media types according to the PID numbers 114 in the packet header 113 in the receiving side.

On the other hand, the clock generating section 1 generates, for instance, as a system clock source, a 27-MHz system clock from a 13.5-MHz clock signal 101 used for sampling of a video signal 102, and outputs clock information 105 for the generated clock at a specified time interval. The clock information 105 is putted in the TS packet in the media multiplexing section 6 for transmission, and is used for regeneration of the clock in the receiving side. Herein, it is assumed that clock information 105 is transmitted with a packet having a PID number of PD-aC. Detailed description will be made later for a clock regenerating method using this clock information 105.

In the program-specific control information generating section 5, program-specific control information 109 shown in FIG. 15 is generated. In the information, PID numbers of a packet each used for transmitting the video coded information 106, the aural coded information 107, the information coded information 108 and the clock information 105, media types to each of the coded information, and a coding system are described as information for packet ID numbers. This program-specific control information 109 is also designated as a program map table (PMT).

The media multiplexing section 6 generates TS packets having PID numbers corresponding to inputted video coded information 106, aural coded information 107, and information coded information 108 respectively, and in addition, by containing the program-specific control information 109 in a TS packet, the media multiplexing section 6 generates a program-specific control information packet with a PID number of PID-aM. In this case, the clock information 105 generated by the clock generating section 1 is included in the packet with a PID number of PID-aC. Finally, the media multiplexing section 6 multiplies all the packets for the generated video/audio/information/program-specific control information, and generates a packet of program information 110a for the program-a. Similarly, each of the program generating sections 7b to 7n generates each program information 110b, . . . , 110n for each program.

All program control information 111 as shown in FIG. 16 is generated by the all program control information generating section 8. Information for all programs contained in program multiplexed information 112 is written in the all program control information 111, and, for instance, a number of programs, all titles of the program, a PID number of each of the program-specific control information packets, and view ability restricting information or the like are included therein. PID-aM, PID-bM, . . . , PID-nM as PID numbers of program-specific control information packets for the programs a, b, . . . , n are written in the example shown in FIG. 16. This all program control information 111 is also called as Program Association Table (PAT).

Then, the program multiplexing section 9 packetizes the all program control information 111 generated by the all program control information generating section 8 to generate an all program control information packet with PID-P (e.g. 0x00) as a prespecified PID number, multiplexes the generated packet with the TS packets for the program information 110a, 110b, . . . , 110n generated by the program generating sections 7a, 7b, . . . , 7n, and outputs the multiplexed packets as the program multiplexed information 112. In a case where a information generating speed for information to be transmitted (in this case, the program information 110a, 110b, . . . , 110n and all program control information 111) is slower than an output rate (speed) of the program multiplexed information 112 specified at a speed in the transmission path, a null packet (packet information 115 in a TS packet is dummy information) is inserted into the program multiplexed information to match the processing speed by the program multiplexing section 9.

Description is made for operations of a TS receiver for receiving the program multiplexed information 112 transmitted from the TS multiplexing transmission device and regenerating the received information in accordance with the flow of a media regenerating processing shown in FIG. 17.

The TS receiver, when starting to receive program multiplexed information 112 after starting up, at first, fetches thereinto a packet with the prespecified PID number of PID-P, and obtains all program control information.

Then, it is known that programs a, b, . . . , n are contained in the program multiplexed information 112 according to the obtained all program control information. Herein, in a case where the program-a is selected, it is known that program-specific control information therefor is contained in a packet with PID-aM. The receiver fetches thereinto the packet with the PID number of PID-aM, and obtains PID numbers, corresponding to the packets in which the media (video, voice, information) each constituting the program-a and clock information required for media regenerating processing are contained, from the program-specific control information for the program-a. The receiver regenerates each of the media information by receiving each of the packets with the obtained PID numbers.

Herein, description is made for a method of synchronizing frequencies of operating clocks (system clocks) in the transmitting side as well as in the receiving side with the clock information 105 with reference to FIG. 18.

In FIG. 18, in a case where a system clock is generated, for instance, with respect to the video signal 102, the video coding section 2 fetches a 13.5-MHz clock used when the video signal 102 is subjected to sampling as a clock signal 101, and from this signal, a 27-MHz system clock is generated by a PLL 13 (Phase Locked Loop) incorporated in the clock generating section 1. A counter value of a counter 14 for counting the system clock is transmitted to the receiving side at a specified cycle (e.g. once in 100 milliseconds) as clock information 105.

Clock information 116 for a program to be generated is separated from the received program multiplexed information 112 in a separating section 16 of the TS receiver 12. When receiving is started, a value of the separated clock information 116 is set in the counter 14 of the clock generating section 17, and the 27 MHz system clock is operated in the PLL 13 for counting up the counter 14. Then, the received and separated value of the clock information 116 is compared to the counter 14 by a comparator 18, a difference is given to the PLL 13, and the frequency of the system clock is corrected according to the difference. After the step and on, the same comparison and correction as those described above are executed to received and separated clock information 116, so that, by decoding coded information with the system clock 7 in the transmitting side, accurate video signals and aural signals can be regenerated. It should be noted that, in a case where fluctuation is generated in transmission of the clock information during the transmission thereof, turbulence is generated in the regeneration of the system clock in the receiving side, and an overflow or an underflow is generated in the buffer of the decoder because of inconsistency between the frequency of the system clock in the transmitting side and that in the receiving side. As a result, turbulence is generated in a received video and a sound or the like.

By the way, in the latest community antenna television system or the like, the TS multiplexing transmission device as already described above multiplexes a plurality of programs and transmits the multiplexed programs. In a case where a viewer subscribes to a plurality of broadcasters as described above, at first, the viewer selects one of the broadcasters, and then selects a program that the viewer wants to look at out of the plurality of programs broadcasted from the broadcaster according to the flow shown in FIG. 17.

FIG. 19 is an example showing the broadcasting system, and there is shown herein a case where the TS multiplexing transmission devices 10a, 10b, . . . , 10n described above are provided in each of the broadcasters, and each of the viewers has the TS receiver 12 provided therein and views a program thereby. As for the TS receiver 12, one out of the TS multiplexing transmission devices 10a, 10b, . . . , 10n provided in the broadcasters to which the viewer subscribes is selected by the receive selecting section 11, and a line is connected thereto with a method specified in a transmission path (e.g. a satellite or a ground wave, a coaxial cable, and an optical fiber or the like) between the TS receiver and the selected TS multiplexing transmission device. Then, all program control information, program-specific control information, and media information are obtained from the bit stream transmitted through the selected line and each of the obtained information is regenerated.

The transport stream multiplexing transmission device based on the conventional technology has the functional configuration described above, so that, in the TS receiver, a plurality of transport stream multiplexing transmission devices, namely transport stream cannot simultaneously be obtained from a plurality of broadcasters.

Only by remultiplexing transport streams from the plurality of transport stream multiplexing transmission devices simply into one transport stream for transmission, ID numbers of packets each containing all program control information have the same values in all the transport streams, which makes it impossible to identify which transport stream multiplexing transmission device the transport stream corresponding to one unit of all program control information is sent from.

Even if all program control information contained in transport streams sent from the plurality of transport stream multiplexing transmission devices are taken out therefrom to generate new all program control information, media information can not be obtained because the packet ID number for the media information contained in these transport streams may sometimes be the same as that for others.

The transport stream which has a small amount of capacity of program information and is transmitted by inserting a null packet to match the processing speed is low in transmission efficiency, so that the transmission path can not effectively be utilized.

In a case, for instance, where a plurality of transport streams transmitted through a transmission path with a low speed are remultiplexed into one transport stream and is transmitted through a transmission path with a high speed, it is difficult to match the speed therebetween.

A transport stream from a transport stream multiplexing transmission devices comprises a plurality of programs, so that there is a case where an unnecessary program is also transmitted.

A transport stream from a transport stream multiplexing transmission devices comprises a plurality of programs, so that there is a case where all-ages programs and programs for adult people are mixed therein, and for this reason viewability restriction has to be set in each program.

A transmission delay of packets is sometimes generated due to remultiplication of a plurality of transport streams, so that program clock information contained in the transport stream can not accurately be transmitted, and for this reason, the clock can not accurately be regenerated in the receiving side.

Transmission of each of transport streams from the plurality of transport stream multiplexing transmission devices is discretely executed respectively, so that one of transport streams is not synchronized to others, and for this reason, it is difficult to obtain synchronism between inputted transport streams when packets are remultiplexed.

The conventional type of transport stream multiplexing transmission device has only a function of packetizing media information therein for transmission, so that the device can not fetch the transport stream already multiplexed as input information thereinto, for remultiplexing the information generated in the devices together with media information packets for transmission.

SUMMARY OF THE INVENTION

It is an object of the present invention to provide more numbers of programs without any change in the configuration of a receiving terminal of bit streams by remultiplexing a plurality of multiplexed bit streams (e.g. transport streams) and transmitting the new remultiplexed bit streams. By transmitting a number of programs in batch, it is possible to obtain a high transmission efficiency, to transmit a bit stream to transmission paths each having a different transmission speed, and to realize transmission of only required programs or of only programs with the same viewability with the function for selectively remultiplexing bit streams. Also with the function for correcting program clock information contained in a bit stream or the function for preferentially transferring packets each containing program clock information, program clock information contained in a bit stream after subjected to remultiplexing can be compensated.

A remultiplexing apparatus according to the present invention comprises a control information selecting means for selecting a packet containing program control information from inputted bit streams, a program control information editing means for editing contents of the selected program control information and generating new program control information corresponding to a bit stream to be outputted, and a remultiplexing means for remultiplexing the program control information generated by the program control information editing means with a packet containing media information in the inputted bit stream.

The remultiplexing apparatus comprises the program control information editing means also for updating contents of the program control information in a case where the contents of the program control information contained in the inputted bit stream is updated.

The remultiplexing apparatus comprises the control information selecting means or the remultiplexing means for removing a null packet from inputted bit stream.

The remultiplexing apparatus comprises a means for preferentially multiplexing a packet containing program clock information for regenerating a system clock in the receiving side. The remultiplexing apparatus comprises a null packet inserting means for matching a processing speed to an output rate of the outputted bit stream.

The remultiplexing apparatus comprises an external information packet inserting means for matching a processing speed to an output rate of the outputted bit stream.

The remultiplexing apparatus comprises a program organizing means for deciding program organization for the outputted bit stream from the program control information, the program control information editing means for editing contents of the program control information according to an instruction from the program organizing means, and a remultiplexing means for multiplexing again only packets each containing necessary media information.

The remultiplexing apparatus comprises a program organizing means for obtaining viewability restricting information from the program control information and deciding program organization for the outputted bit stream which decides program organization according to the viewability restricting information, the program control information editing means for editing contents of the program control information according to an instruction from the program organizing means, and the remultiplexing means for multiplexing again only packets each containing necessary media information.

The remultiplexing apparatus comprises the program control information editing means for reallocating ID numbers of packets each containing media information so that ID numbers are not used redundantly, and an ID number reallocating means for reallocating packet ID numbers according to a result of reallocation by the program control information editing means.

The remultiplexing apparatus comprises a means for outputting the bit stream in synchronism to a clock inputted from an external means.

The remultiplexing apparatus comprises a packet synchronism insuring means with a packet synchronizing buffer for insuring packet synchronism between the plurality of inputted bit streams.

The remultiplexing apparatus comprises a system clock regenerating means for regenerating a system clock from a packet containing program clock information included in an inputted bit stream, and a means for inserting a system clock value from the system clock regenerating means as program clock information when the packet is remultiplexed by the remultiplexing means.

The remultiplexing apparatus comprises a program clock information rewriting means for rewriting a packet containing program clock information for regenerating a system clock in the receiving side to program clock information with time fluctuation generated in remultiplication having been corrected.

The remultiplexing apparatus according to the present invention comprises a program control information editing means for instructing an ID number for a packet containing information except all program control information to a multiplexing transmission device generating a bit stream to be inputted into the remultiplexing apparatus, an all program control information aborting means for aborting only a packet containing all program control information from the inputted bit stream, and a remultiplexing means for remultiplexing the all program control information outputted from the program control information editing means and an output from the all program control information aborting means.

The remultiplexing apparatus according to the present invention comprises an all program control information aborting means for aborting only a packet containing the all program control information from the inputted bit stream, one or more units of program generating means for multiplexing media coded information prepared by coding not less than one media information as well as program-specific control information with fixed-length packets and generating one program, an all program control information generating means for generating an all program control information packet, and a remultiplexing means for remultiplexing an output packet from the all program control information aborting means, an output packet from the program generating means, and the all program control information packet.

Other objects and features of this invention will become understood from the following description with reference to the accompanying drawings.

BRIEF DESCRIPTION OF THE DRAWINGS

FIG. 15 is an explanatory view showing an example of configuration of a program-specific control information packet in the TS multiplexing transfer apparatus based on the conventional technology;

FIG. 16 is an explanatory view showing an example of configuration of an all program control information packet in the TS multiplexing transfer apparatus based on the conventional technology;

DESCRIPTION OF THE PREFERRED EMBODIMENTS

Description is made hereinafter for one of embodiments of the remultiplexing apparatus according to the present invention with reference to FIG. 1.

Figure 1:
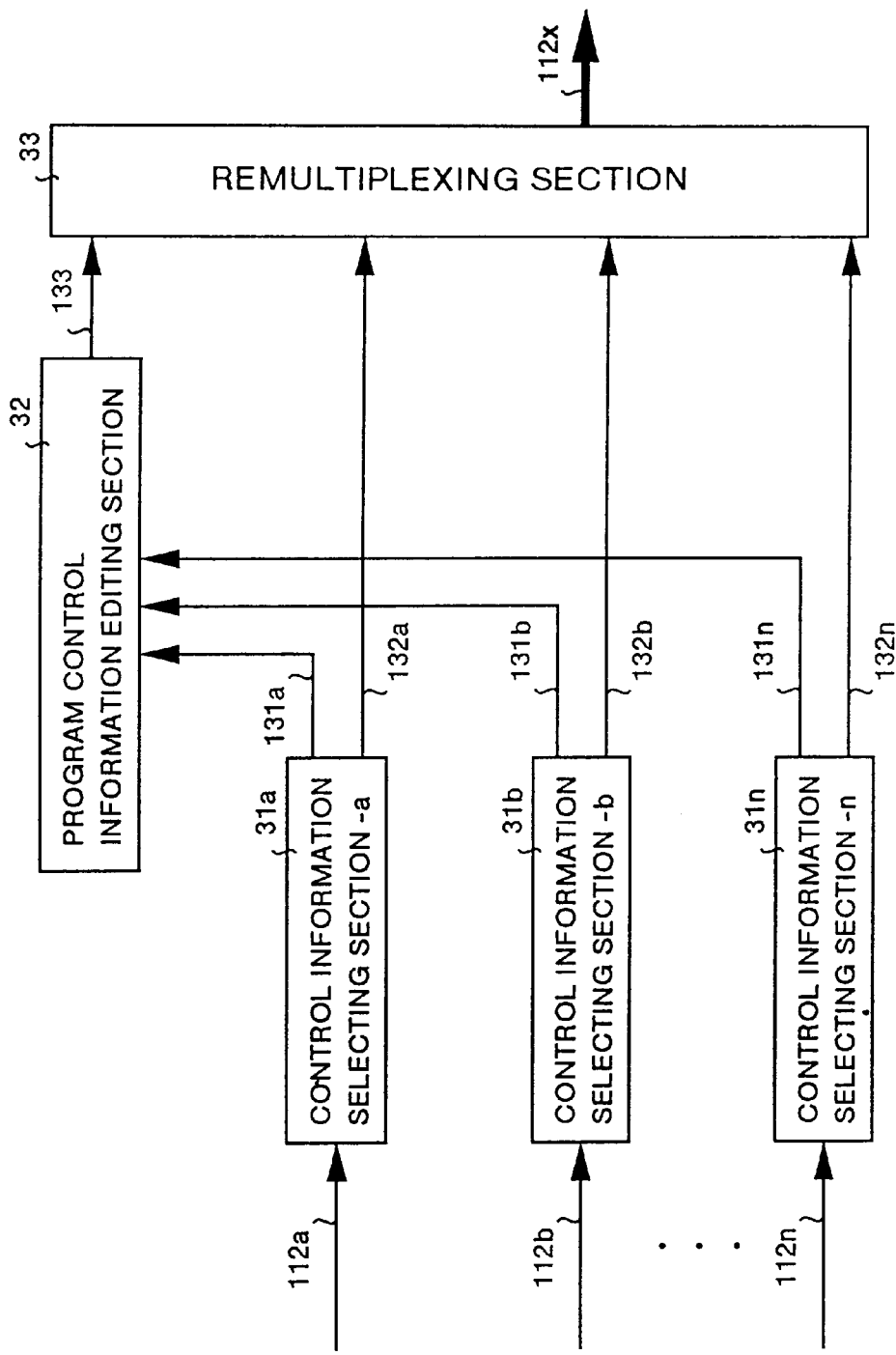
FIG. 1 is a block diagram showing a remultiplexing apparatus according to one of embodiments of the present invention.

FIG. 1 shows a block diagram of the remultiplexing apparatus according to the embodiment of the present invention.

In the figure, designated at the reference numerals 31a, 31b, . . . , 31n are a control information selecting section as a control information selecting means respectively, at 32 a program control information editing section as a program control information editing means, and at 33 a remultiplexing section as a remultiplexing means.

Next description is made for operations in the remultiplexing apparatus in FIG. 1.

At first, description is made for operations of the control information selecting sections 31a, 31b, . . . , 31n with reference to the control information selecting section 31a as an example.

The control information selecting section 31a separates a packet containing coded media information and a packet containing program control information from program multiplexed information 112a received through a transmission path according to each of PID numbers, and outputs the program control information packet 131a and the media information packet 132a.

Herein, the program control information includes, for instance, program-specific control information (PMT) and all program control information (PAT). The all program control information is contained in a packet with the prespecified PID number of PID-P (e.g. 0×00), which makes it possible to identify it at once. On the other hand, as for the program-specific control information, a list of PID numbers (PID-aM, PID-bM, . . . , PID-nM) in which program-specific control information is contained is written in the all program control information. As a result, the control information selecting section 31a outputs a packet with PID numbers including therein PID-P, PID-aM, PID-bM, . . . , and PID-nM to the program control information editing section 32 as a program control information packet 131a, and also a media information packet 132a with the PID numbers other than the numbers described above to the remultiplexing section 33.

Similarly, each of the control information selecting sections 31b, . . . , 31n selectively picks out each of program control information packets 131b, . . . , 131n from program multiplexed information 112b, . . . , 112n respectively, and transfers the packet taken out as described above to the program control information editing section 32, and also transfers each of remained media information packets 132b, . . . , 132n to the remultiplexing section 33.

Figure 2:
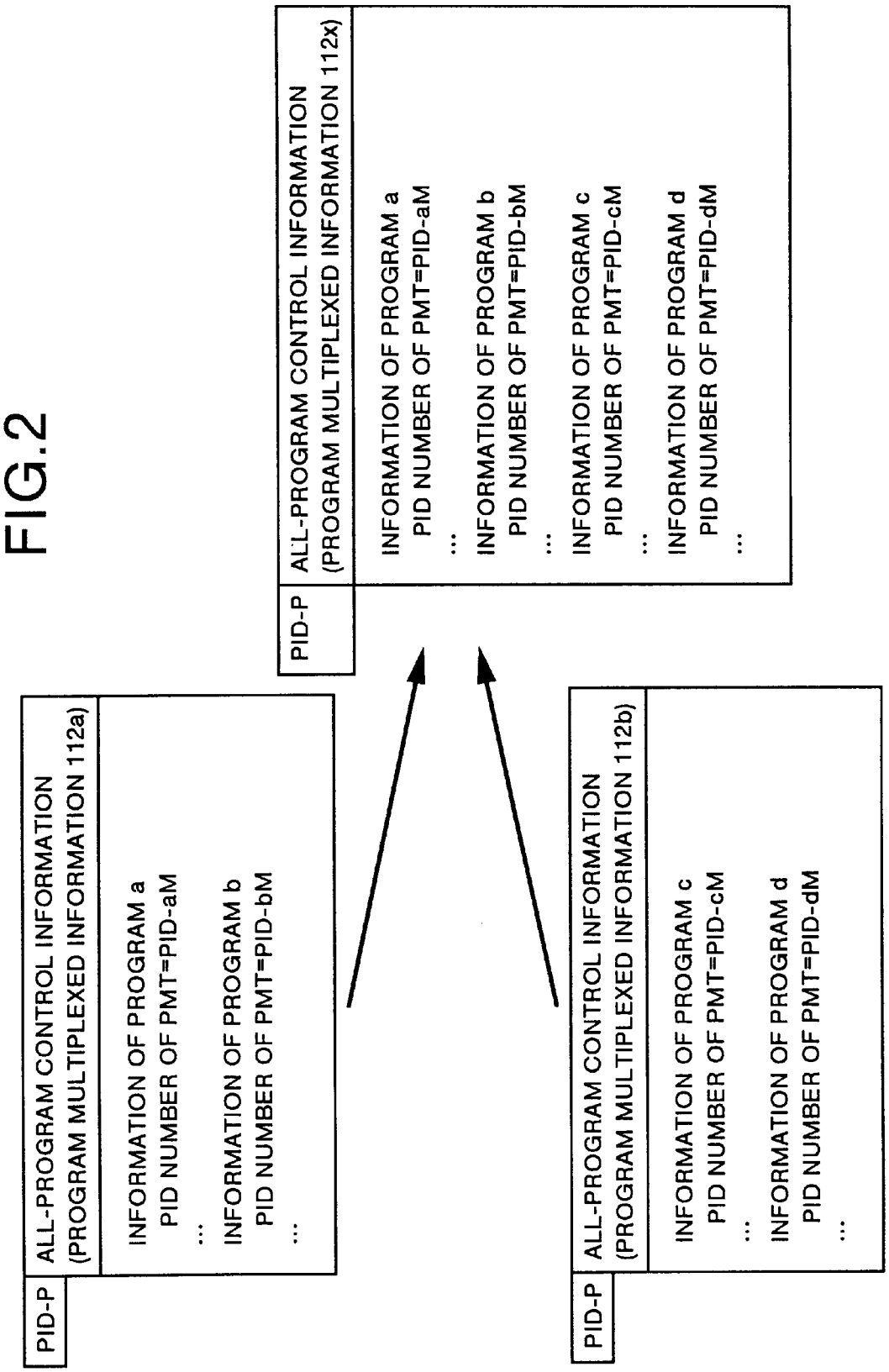
FIG. 2 is an explanatory view of new all program control information for remultiplication according to one of the embodiments of the present invention.

Next description is made for contents of PAT and PMT to be edited in the program control information editing section 32. At first, the program control information editing section 32 takes out the PAT with the PID number of PID-P from the inputted program control information packets 131a, 131b, . . . , 131n, and obtains n units of different PAT. Then, the section 32 obtains all of the PID numbers of PMT corresponding to programs each written in each of the PAT, and generates a packet containing a new PAT in which the n units of different PAT are integrated to one unit thereof as shown in FIG. 2. In the case where a PID number of the PMT is the same as that of other one, the PID number of the information in the PAT is reallocated to a new PID number so as to avoid identification of the two.

On the other hand, in a case where the PID numbers in the PAT corresponding to the packet containing the PMT from the program control information 131a, 131b, ..., 131n have been reallocated, the PID numbers in the corresponding packet (PMT) are rewritten. The all program control information packet and the packet containing all the program-specific control information each generated as described above are transferred to the remultiplexing section 33 as program control information 133 for remultiplication.

Finally, the remultiplexing section 33 again multiplexes the program control information 133 transferred from the program control information editing section 32 for remultiplication and the packets 132a, 132b, ..., 132n each containing media information transferred from each of the control information selecting section 31a, 31b, ..., 31n with a packet, and transmits the remultiplexed packet as new program multiplexed information 112x.

As described above, the remultiplexing section 33 selects a packet containing program control information from inputted plurality of bit streams, generates new program control information by performing edits of the packet to contents matching to an outputted bit stream, multiplexes again the packet containing media information in the inputted bit stream and the newly generated program control information, and generates a new bit stream, which makes it possible to obtain more numbers of program with one bit stream without any change to be executed to the configuration in the bit stream receiver.

Description is made for another embodiment of the method of generating program control information with reference to FIG. 1.

Herein, new program control information 133 is generated only when the contents of each of the inputted program control information 131a, 131b, ..., 131n has been updated, and the updated information is transmitted to the remultiplexing section 33. Whether the contents has been updated or not can be checked by a method in which each of inputted program control information 131a, 131b, ..., 131n is temporarily stored in the remultiplexing section and the stored information is successively compared to newly inputted program control information 131a, 131b, ..., 131n one by one, or by a method in which a version number is previously written in each of the program control information 131a, 131b, ..., 131n, the version number is changed when the contents is changed, and whether the contents is changed or not can be known by checking whether the version number has been changed or not.

In a case where contents of inputted program control information 131a, 131b, ..., 131n has not been updated, new program control information 133 is not required to be generated. For instance, in a case where the program control information 133 is periodically transmitted, the same program control information 133 may be sent.

As described above, in a case where the contents of program control information included in inputted plurality of bit streams has been updated, correct program control information and media information can be obtained in the bit stream receiver by updating the contents of generated program control information.

Description is made for an example in which transmission efficiency can be improved by omitting null packets.

Each of the control information selecting sections 31a, 31b, ..., 31n aborts a null packet contained in each of the program multiplexed information 112a, 112b, ..., 112n received through the transmission path, and separates the program control information 131a, 131b, ..., 131n from the packets 132a, 132b, ... 132n each containing media information therein. Each of the control information selecting sections transmits each of the program control information 131a, 131b, ..., 131n to the program control information editing section 32, and also transmits the packets 132a, 132b, ..., 132n containing media information therein with null packet having beam aborted to the remultiplexing section 33 like in Embodiment 1. The remultiplexing section 33 multiplexes only packets not containing null packets, so that each of the sections outputs the program multiplexed information 112x not containing null packets.

It is assumed in the example described above that null packets are aborted in the control information selecting sections 31a, 31b, ..., 31n, but the same effect can be obtained even if the null packets are aborted when the packets are multiplexed again by the remultiplexing section 33.

As described above, by removing null packets from inputted packets, the transmission efficiency can be improved, and the transmission path can effectively be utilized.

Description is made for an example in which an error to the program clock information is suppressed.

Controls are provided so that if there is any packet containing program clock information in packets, the program clock information is preferentially multiplexed again and an error of the clock information is made to be a minimum value without any change of the clock information for transmission when each of packets 141a, 141b, ..., 141n containing media information transferred from each of the control information selecting sections 31a, 31b, ..., 31n is multiplexed again. Whether the program clock information is contained therein or not can be identified according to a PID number for the packet with clock information written in the PMT.

As described above, in packets including program clock information, the packet containing the program clock information therein is preferentially remultiplexed and is transmitted, so that an error to the program clock information can be made to the minimum value with a simple sequential operation.

Figure 3:
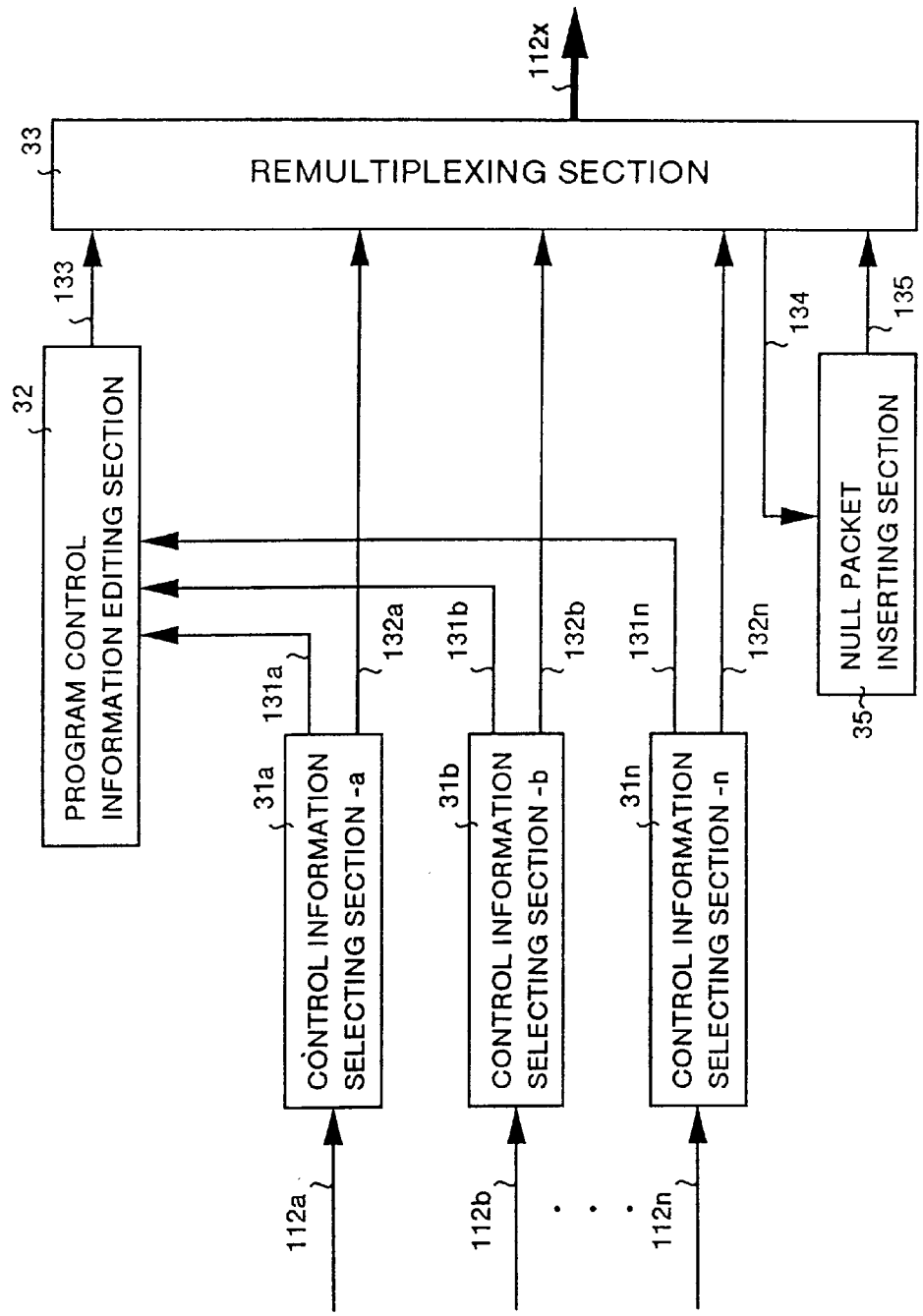
FIG. 3 is a block diagram showing a remultiplexing apparatus according to one of the embodiments of the present invention.

FIG. 3 is a block diagram of a remultiplexing apparatus according to another embodiment of the present invention.

In FIG. 3, the reference numeral 35 indicates a null packet inserting section, and the same reference numerals are assigned to the sections corresponding to those shown in FIG. 1 excluding the section described above.

Next description is made for different points from Embodiment 1.

The program control information editing section 32 transfers the program control information packet 133 generated anew to the remultiplexing section 33 like that in Embodiment 1, and the control information selecting section 31a, 31b, ..., 31n transfer media information packets 132a, 132b, ..., 132n thereto respectively.

When the transferred program control information packet 133 and the media information packets 132a, 132b, ..., 132n are multiplexed again as new program multiplexed information 112x by the remultiplexing section 33, and in a case where a rate of information to be transmitted is less than an output rate of the program multiplexed information 112x, a null packet inserting signal 134 is outputted from the remultiplexing section 33 to a null packet inserting section 35. The null packet inserting section 35 outputs a null packet 135 to the remultiplexing section 33 according to the null packet inserting signal 134, the null packet 135 is multiplexed on the program multiplexed information 112x, so that the processing speed is matched to the output rate.

As described above, in a case where a rate of the remultiplexed bit stream is slower than an output rate, it is possible to match a processing speed to the output rate of a bit stream to be outputted by inserting a null packet.

Figure 4:
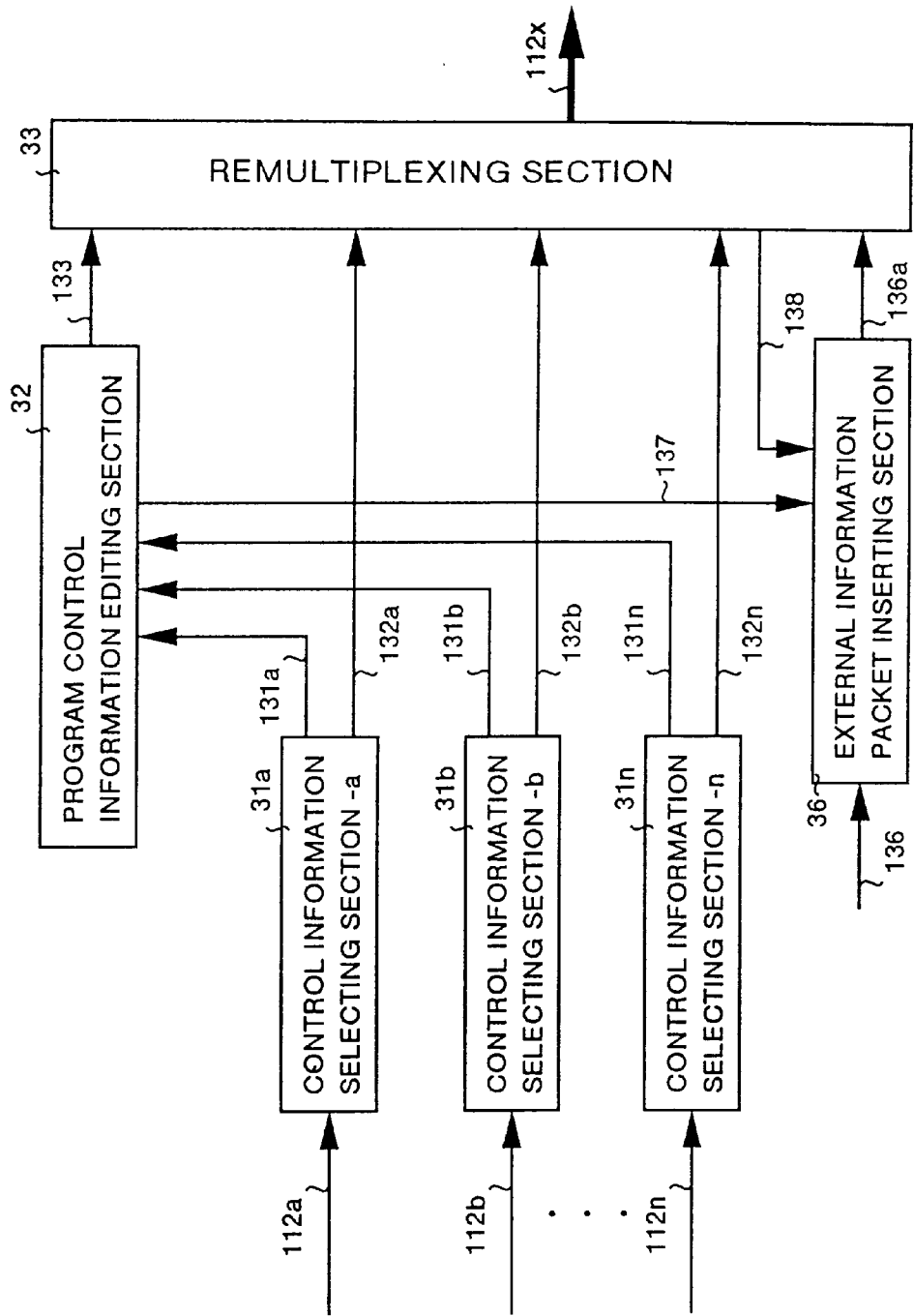
FIG. 4 is a block diagram showing a remultiplexing apparatus according to one of the embodiments of the present invention.

FIG. 4 is a block diagram of a remultiplexing apparatus according to another embodiment of the present invention.

In FIG. 4, the reference numeral 36 indicates an external information packet inserting section, and the same reference numerals are assigned to the sections corresponding to those shown in FIG. 1 excluding the section described above.

Next description is made for a different point from that in Embodiment 1. The program control information editing section 32 inserts an external information packet 136 inputted from outside to the program multiplexed information 112x, and outputs control information 137 concerning to the external information packet containing information for a PID number or the like required for remultiplication to the external information packet inserting section 36.

When the transferred program control information packet 133 and the media information packets 132a, 132b, . . . , 132n are multiplexed again as new program multiplexed information 112x by the remultiplexing section 33, and in a case where a rate of information to be retransmitted is less than an output rate of the program multiplexed information 112x, an external information packet inserting signal 138 is outputted from the remultiplexing section 33 to the external information packet inserting section 36. The external information packet inserting section 36 packetizes external information 136 with control information 137 according to the external information packet inserting signal 138, and outputs an external information packet 136a to the remultiplexing section 33. The remultiplexing section 33 multiplies the external information packet 136a on the program multiplexed information 112x, so that the processing speed is matched to the output rate of the information 112x.

As described above, in a case where a transmission speed (rate) of the remultiplexed bit stream is slower than an output rate, it is possible to match a processing speed to the output rate of a bit stream to be outputted by inserting a information packet inputted from outside, and also to effectively utilize a transmission path by transmitting external information.

Figure 5:
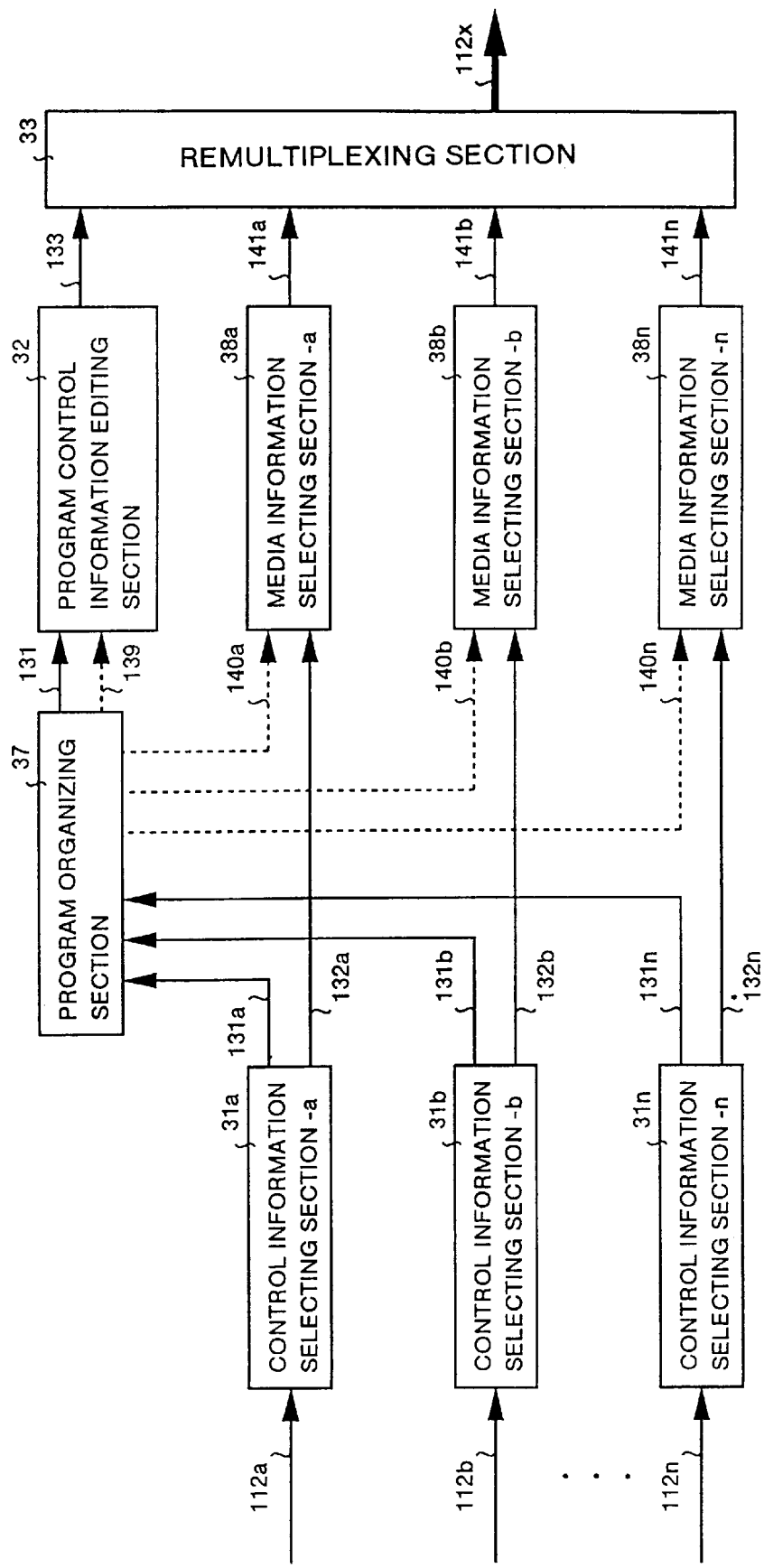
FIG. 5 is a block diagram showing a remultiplexing apparatus according to one of the embodiments of the present invention.

FIG. 5 is a block diagram showing a remultiplexing apparatus according to another embodiment of the present invention.

In FIG. 5, designated at the reference numeral 37 is a program organizing section as a program organizing means for deciding program organization to be remultiplexed, at 38a, 38b, . . . , 38n a media information selecting section for selecting only specified media information respectively, and the same reference numerals are assigned to the sections corresponding to those shown in FIG. 1 excluding the section described above. Herein, the remultiplexing means for remultiplexing only necessary media information comprises media information selecting sections 38a, 38b, . . . , 38n and the remultiplexing section 33.

Next description is made for a different point from that in Embodiment 1. The control information selecting sections 31a, 31b, . . . , 31n transfer the taken-out program control information packets 131a, 131b, . . . , 131n to the program organizing section 37, and also transfer other media information packets 132a, 132b, . . . , 132n to the media information selecting sections 38a, 38b, . . . , 38n respectively.

The program organizing section 37 takes out a packet with PID-P containing all program control information (PAT) from the program control information packets 131a, 131b, . . . , 131n transferred from the control information selecting sections 31a, 31b, . . . , 31n, and selects required programs out of the programs. This selection is executed by, for instance, previously setting it in the program organizing section 37, or setting it in an inputting means provided therein, or there is a method of selecting it according to information in the program control information.

Also, the program organizing section 37 generates PID information for a packet containing program-specific control information for the selected program corresponding to each of the program multiplexed information 112a, 112b, . . . , 112n as program organized information 139, and transfers the generated information to the program control information editing section 32. The program organizing section 37 takes out all of the program-specific control information for the selected program corresponding to each of the control information selecting sections 31a, 31b, . . . , 31n according to the program organized information 139, obtains PID indicating all the media information contained in the selected program, and transfers the PID to each of the media information selecting sections 38a, 38b, . . . , 38n as selected PID information 140a, 140b, . . . , 140n respectively, and also transfers a packet 131 containing program control information transferred from the control information selecting sections 31a, 31b, . . . , 31n for the program control information editing section 32.

The program control information editing section 32 takes out PID information for a packet containing program-specific control information for all the programs shown in the program organized information 139 transferred from the program organizing section 37, and stores the PID as PID information before PID converted information for a packet containing the program-specific control information is converted.

Then, the program control information editing section 32 checks the PID information before the information is converted, and takes a new PID to avoid duplication in a case where there are two same PIDs therein, and stores the PIDs as PID converted information before and after the information is converted.

When there is any duplication as described above, the program control information editing section 32 generates a new program control information packet 133 from the program control information packet 131 transferred from the program organizing section 37 according to the PID converted information for the stored program-specific control information packet, and transfers the new packet to the remultiplexing section 33. If there is not any duplication, the program control information editing section 32 transfers the program control information packet 131 as it is to the remultiplexing section 33 as a the program control information packet 133.

Next description is made for operations in the media information selecting sections 38a, 38b, . . . , 38n with reference to the media information selecting section 38a as an example.

The media information selecting section 38a, at first, stores selected PID information 140a transferred from the program organizing section 37. Then the media information selecting section 38a selectively takes out only a packet with the PID number specified in this selected PID information 140a from the packet 132a containing the media information transferred from the control information selecting section 31a, and transfers the packet to the remultiplexing section 33 as a media information packet 141a with the selected PID.

Similarly, each of the media information selecting section 38b, ..., 38n selectively takes out only a packet with the PID number specified in the selected PID information 140b, ..., 140n transferred from the program organizing section 37, and transfers the selected packet to the remultiplexing section 33 as each of media information packets 141b, ..., 141n with the selected PID.

The remultiplexing section 33 multiplies again the selected program control information packet 133 according to the program organizing information 139 and the media information packets 141a, 141b, ..., 141n each with the selected PID as program multiplexed information 112x for transmission.

As described above, by remultiplexing only a selected program from program control information contained in an inputted bit stream, only a required program can be transmitted. In a case where a bit stream generated by remultiplexing all programs contained in all the inputted bit streams is faster than a transmission rate in transmission path, the generated bit rate can be transmitted by selectively transmitting a program.

Next description is made for an example in which a viewability restricted program is organized as an embodiment in which the media information described above is selected and remultiplexed. Herein, description is made for operations in a case where the program organizing section 37 generates program multiplexed information comprising only programs for adult as the example described above.

The program organizing section 37 obtains packets containing all of the all program control information each with PID-P from the packets 131a, 131b, ..., 131n each containing the program control information transferred from each of the control information selecting sections 31a, 31b, ..., 31n, obtains program-specific information corresponding to all the programs obtained from the packets containing the obtained all of the all program control information, and gets viewability restricting information from the program-specific control information.

The program organizing section 37 selects a program with restricted viewability to adult people according to the viewability restricting information to all the obtained programs, and stores PID information for packets containing program-specific control information for selected programs for adult people corresponding to the program multiplexed information 112a, 112b, ..., 112n respectively as program organized information 139 for programs with restricted viewability for adult people.

Also the program organizing section 37, at first, takes out all the program-specific control information for selected programs with restricted viewability for adult people corresponding to the control information selecting sections 31a, 31b, ..., 31n according to the stored program organized information 139 for programs with restricted viewability for adult people, obtains PIDs indicating all the media information contained in the selected programs with restricted viewability for adult people, and transfers the obtained PIDs to the media information selecting section 38a, 38b, ..., 38n, as selected PID information 140a, 140b, ..., 140n for programs with restricted viewability for adult people.

Then, the program organizing section 37 transfers the stored program organized information 139 for programs with restricted viewability for adult people, and the packet 131 containing the program control information transferred from the control information selecting sections 31a, 31b, ..., 31n to the program control information editing section 32.

Description is made for operations of the program control information editing section 32.

The program control information editing section 32 takes out PID information for a packet containing program-specific control information for all the programs shown in the program organized information 139 for programs with restricted viewability for adult people transferred from the program organizing section 37, and stores them as PID information before the PID converted information for the packet containing the program-specific control information for programs with restricted viewability for adult people is converted.

Then, the program control information editing section 32 checks the PID information before the information is converted, and in a case where there are the same PIDs therein, the program control information editing section 32 takes a new PID so as to avoid duplication, and stores it as PID converted information for the packet containing the program-specific control information for programs with restricted viewability for adult people before and after the PID converted information is converted.

The program control information editing section 32 takes out all of the packets each containing program-specific control information shown in the information before PID information is converted of the PID converted information for the program-specific control information for the stored programs with restricted viewability for adult people from the packet containing the program control information transferred from the program organized section 37. And in a case where there are the same PIDs therein, the PID is reallocated to a PID after the PID is converted according to the PID converted information, and in a case where there are no duplicated PIDs, the packet containing the program-specific control information for the stored programs with restricted viewability for adult people is updated as it is.

The program control information editing section 32 generates a packet containing a new unit of all program control information with restricted viewability to adult people according to the PID converted information for packets containing the program-specific control information for the stored programs with restricted viewability for adult people.

As described above, the program control information editing section 32 transfers the packet containing the updated program-specific control information for the programs with restricted viewability to adult people and the packet containing the new unit of all program control information generated with restricted viewability for adult people as a packet 133 containing the new program control information to the remultiplexing section 33.

Next description is made for operations in the media information selecting sections 38a, 38b, ..., 38n with the media information selecting section 38a used as an example.

The media information selecting section 38a, at first, stores selected PID information 140a for the programs with restricted viewability to adult people transferred from the program organizing section 37, selectively takes out only a packet with the PID number specified in the selected PID information 140a for the programs with restricted viewability to adult people from the packet 132a containing the media information transferred from the control information selecting section 31a, and transfers the packet to the remultiplexing section 33 as a packet 141a containing the media information with the selected PID.

Similarly, each of the media information selecting section 38b, . . . , 38n selectively takes out only a packet with the PID number specified in the selected PID information 140b, . . . , 140n for the programs with restricted viewability for adult people transferred from the program organizing section 37, and transfers the packet containing the media information for the programs with restricted viewability to adult people to the remultiplexing section 33 as each of the packets 141b, . . . , 141n containing media information with the selected PID.

The remultiplexing section 33 multiplexes again the packet 133 containing the program control information for the programs with restricted viewability to adult people transferred from the program control information editing section 32 and the packets 141a, 141b, . . . , 141n each containing the media information with the selected PID for the programs with restricted viewability to adult people transferred from the media information selecting section 38a, 38b, . . . , 38n as program multiplexed information 112x for the programs with restricted viewability to adult people for transmission.

As described above, by obtaining the viewability restricting information contained in the program control information for an inputted bit stream, and remultiplexing only the selected program according to the viewability restricting information described above, only a required program can be transmitted.

Figure 6:
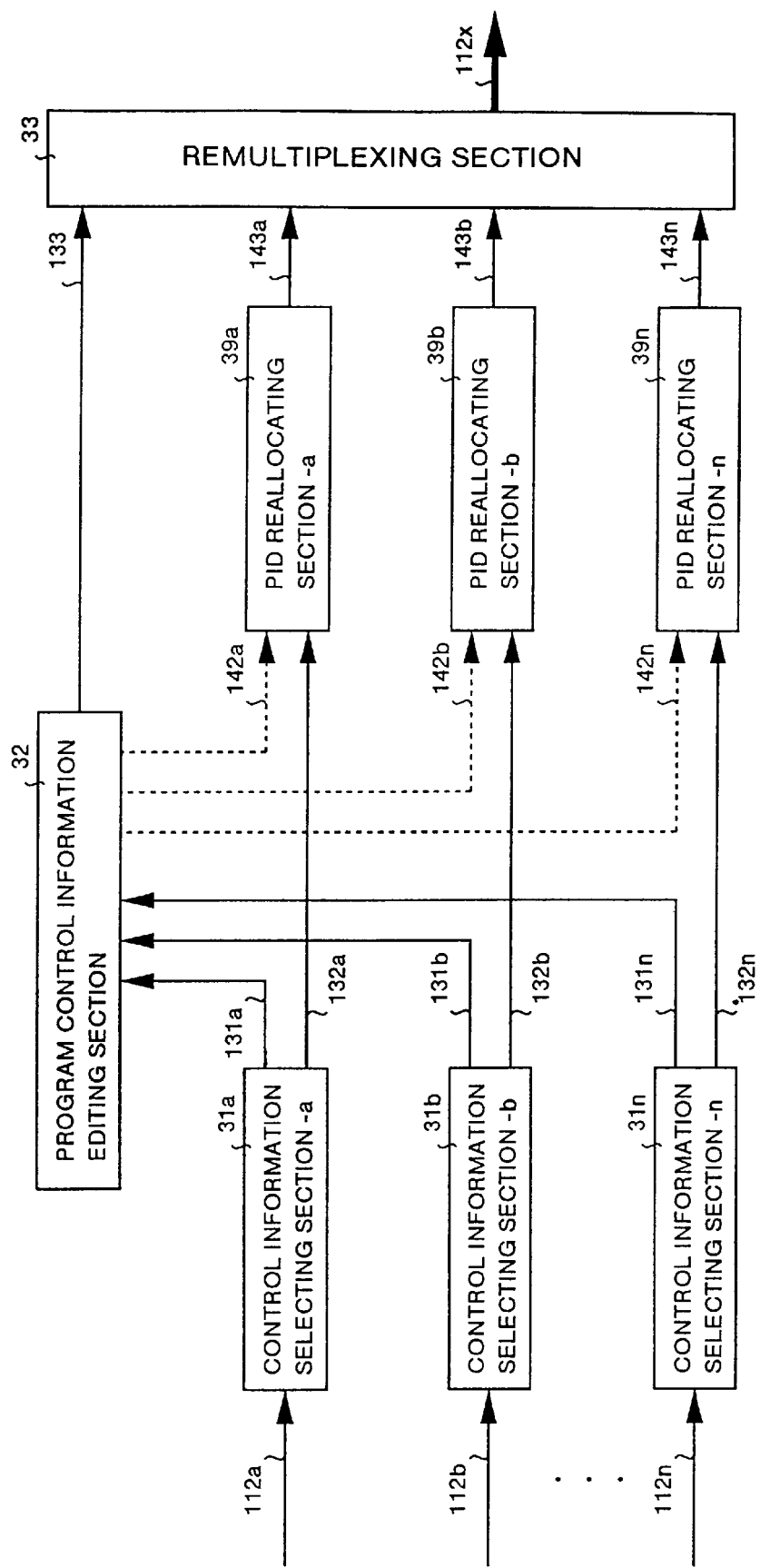
FIG. 6 is a block diagram showing a remultiplexing apparatus according to one of the embodiments of the present invention.

FIG. 6 is a block diagram of a remultiplexing apparatus according to another embodiment of the present invention.

In FIG. 6, designated at the reference numerals 39a, 39b, . . . , 39n are PID reallocating sections each as a PID reallocating means for reallocating a PID for a packet containing media information respectively, and the same reference numerals are assigned to the sections corresponding to those shown in FIG. 1 excluding the sections described above.

Next description is made for a different point from that in Embodiment 1. Firstly, description is made for operations in the control information selecting sections 31a, 31b, . . . , 31n.

The control information selecting sections 31a, 31b, . . . , 31n transfer the packets 131a, 131b, . . . , 131n containing the selectively taken-out program control information to the program control information editing section 32, and also transfer media information packets 132a, 132b, . . . , 132n which are the remainders after the program control information packets 131a, 131b, . . . , 131n have been selectively taken out to the PID reallocating sections 39a, 39b, . . . , 39n, respectively.

The program control information editing section 32 obtains PID information for packets containing all of the program-specific control information from all the all program control information for PID-P contained in the packets 131a, 131b, . . . , 131n each containing the program control information transferred from each of the control information selecting sections 31a, 31b, . . . , 31n, obtains a new PID so that PID information for the packets containing the obtained all of the program-specific control information are not duplex, and stores PIDs corresponding to the program multiplexed information 112a, 112b, . . . , 112n before and after the PIDs are converted respectively as PID converted information for the packets containing the program-specific control information.

The program control information editing section 32 obtains PID information for all of the media information packets shown in all the program-specific control information according to all the packets containing the program-specific control information described above.

If there is any media information packet with an identical PID number in the PID information for all of the media information packets for all the obtained programs, the program control information editing section 32 obtains a new PID number to avoid the identical numbers, and stores PIDs corresponding to the program multiplexed information 112a, 112b, . . . , 112n after the PIDs are converted respectively as PID converted information for the packets containing the media information.

The program control information editing section 32 transfers PID reallocating information 142a, 142b, . . . , 142n, for instructing reallocation of the PID for the packet containing media information which includes the PID information before the media information packet is not converted and the PID information after it is converted on each of the program multiplexed information 112a, 112b, . . . , 112n according to the PID converted information for the stored media information packets, to the PID reallocating sections 39a, 39b, . . . , 39n.

The program control information editing section 32 generates a new unit of all program control information and corrects the PID information for the packet containing all of the program-specific control information according to the PID converted information for the stored media information packet, and corrects PID information for the packet containing media information for all the programs contained in the packet containing all of the program-specific control information of which PID information is corrected according to the PID converted information for the packet containing the stored program-specific control information, and updates all the program-specific control information.

The program control information editing section 32 transfers the newly generated all program control information packet and the updated all of the program-specific control information to the remultiplexing section 33 as the program control information 133 for remultiplication.

Next description is made for operations in the PID reallocating sections 39a, 39b, . . . , 39n with the PID reallocating section 39a used as an example.

The PID reallocating sections 39a stores PID information before and after the media information packet contained in the PID reallocated information 142a transferred from the program control information editing section 32 is converted.

The PID reallocating sections 39a reallocates the PID for the media information packet 132a transferred from the control information selecting section 31a to other one according to the PID information before and after the stored media information packet is converted, and transfers it to the remultiplexing section 33 as the media information packet 143a with the reallocated PID.

The PID reallocating sections 39b, . . . , 39n reallocate the PID, like the PID reallocating section 39a, for each of the media information packets 132b, . . . , 132n transferred from the control information selecting sections 31b, . . . , 31n to other one according to the PID information before and after the media information packet contained in each of the PID reallocated information 142b, . . . , 142n from the program control information editing section 32 is converted, and transfer it to the remultiplexing section 33 as the packets 143b, . . . , 143n containing media information each with the reallocated PID.

The remultiplexing section 33 multiplies again the packet 133 containing the program control information selected according to the program organizing information 139 and the media information packets 143a, 143b, . . . , 143n each with the reallocated PID as program multiplexed information 112x for transmission.

As described above, in an bit stream in which ID numbers of packets each containing media information are reallocated so that the two numbers are not identical, the ID numbers of the packets each containing the media information are reallocated to other number, and the packets each with the reallocated ID number are remultiplexed, one packet ID number can be given to one unit of media information, so that the bit stream receiver can obtain media information by identifying them.

Figure 7:
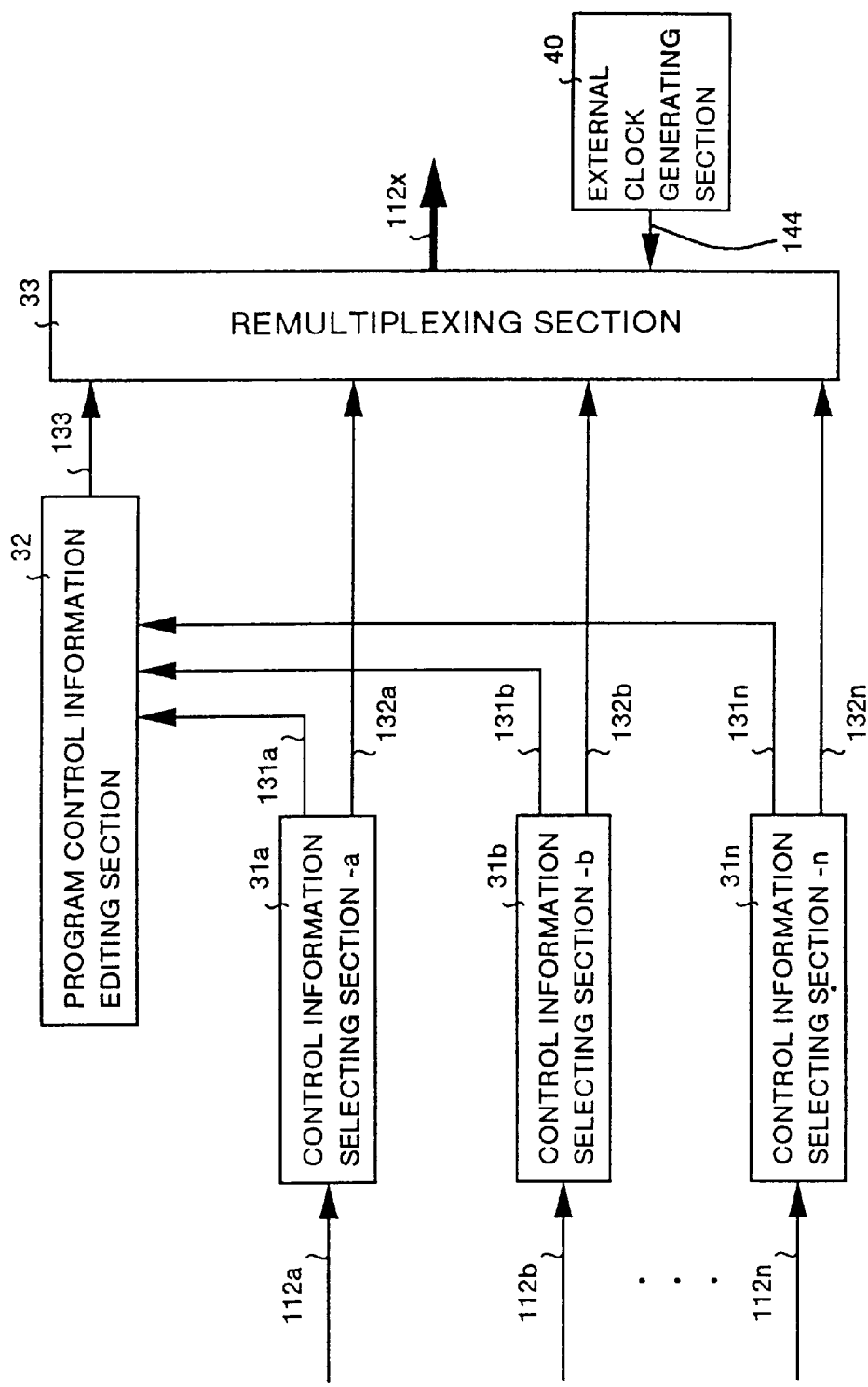
FIG. 7 is a block diagram showing a remultiplexing apparatus according to one of the embodiments of the present invention.

FIG. 7 is a block diagram of a remultiplexing apparatus according to another embodiment of the present invention.

In FIG. 7, the reference numeral 40 indicates an external clock generating section for generating a system clock from the clock signals inputted from outside, and the same reference numerals are assigned to the sections corresponding to those shown in FIG. 1 excluding the sections described above.

Next description is made for a different point from that in Embodiment 1. The external clock generating section 40 generates a frequency clock used for transmitting the program multiplexed information 112x, and the remultiplexing section 33 receives the generated clock as a transmission path clock signal 144.

When it is to transmit the packet 133 containing the program control information transferred from the program control information editing section 32 and the packets 141a, 141b, . . . , 141n each containing media information transferred from each of the control information selecting section 31a, 31b, . . . , 31n as program multiplexed information 112x by multiplexing them again, the remultiplexing section 33 remultiplies the packets described above by synchronizing to the received transmission path clock signal 144 and outputs program multiplexed information 112x.

As described above, by synchronizing to the inputted clock from outside and outputting the bit stream, synchronization in transmission is easily provided.

Figure 8:
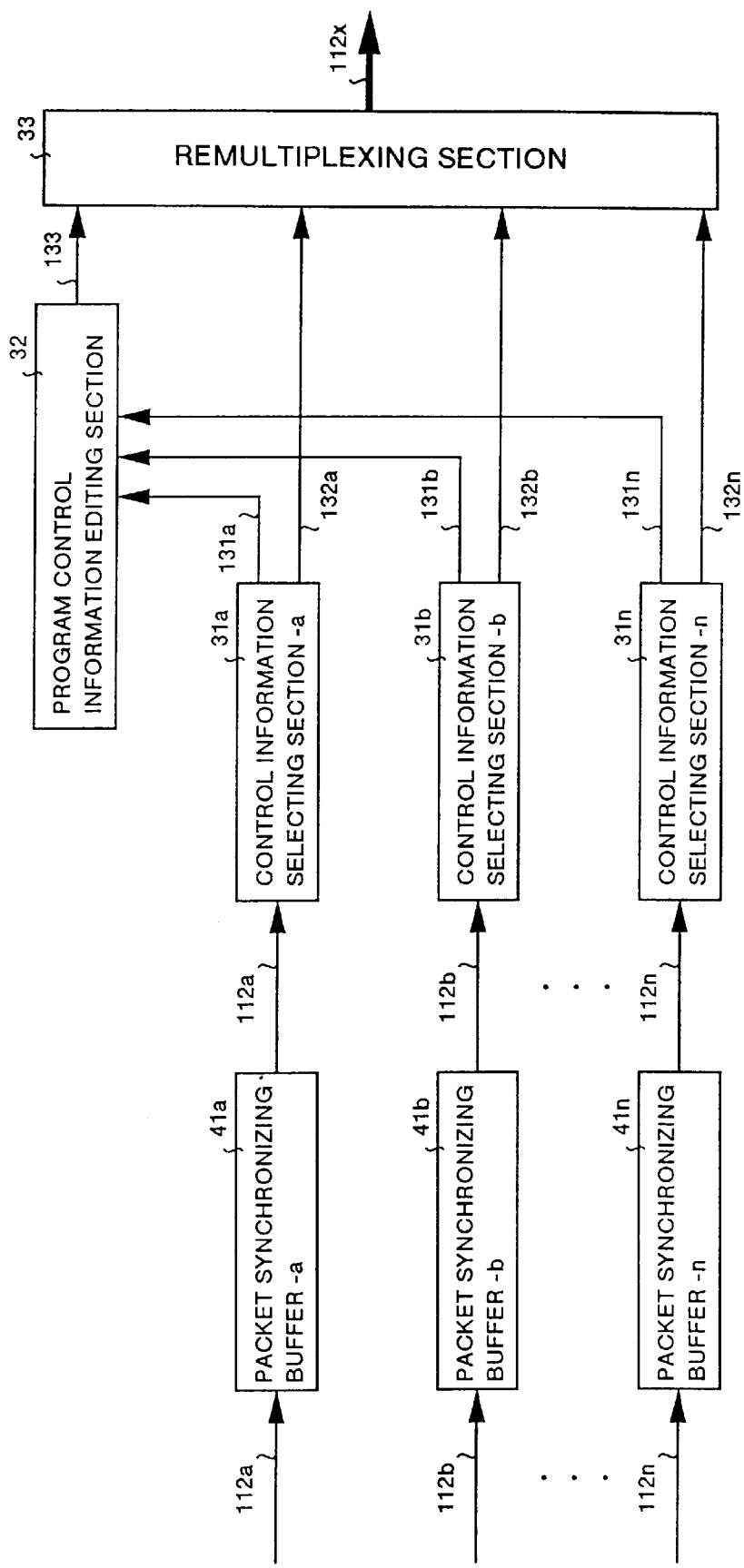
FIG. 8 is a block diagram showing a remultiplexing apparatus according to one of the embodiments of the present invention.

FIG. 8 is a block diagram of a remultiplexing apparatus according to another embodiment of the present invention.

In FIG. 8, designated at the reference numerals 41a, 41b, . . . , 41n are FIFO (First In First Out) type of packet synchronizing buffers for temporarily storing program multiplexed information 112a, 112b, . . . , 112n respectively, and the same reference numerals are assigned to the sections corresponding to those shown in FIG. 1 excluding the sections described above.

Figure 9:
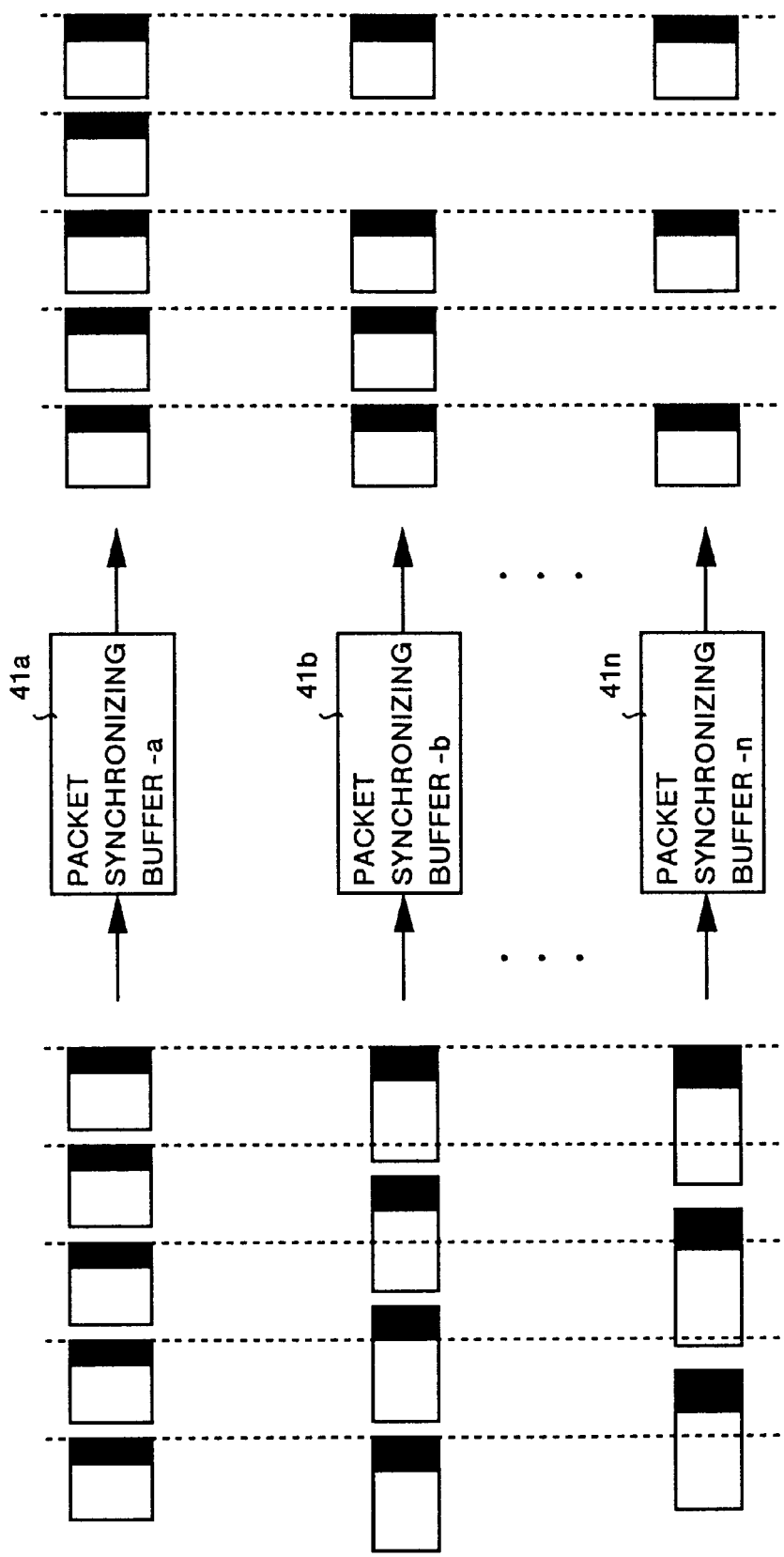
FIG. 9 is an explanatory view for explanation of a function of a packet synchronizing buffer according to one of the embodiments of the present invention.

Next description is made for a different point from that in Embodiment 1. At first, as shown in FIG. 9, the program multiplexed information 112a, 112b, . . . , 112n transferred at each of transmission timing respectively are stored in the packet synchronizing buffers 41a, 41b, . . . , 41n. At this point of time, program multiplexed information 112a, 112b, . . . , 112n to be inputted are discretely inputted at a different speed, so that the starting byte between TS packets is not always identical (synchronism) to each other. For this reason, each of the packet synchronizing buffers 41a, 41b, . . . , 41n synchronizes the starting byte of each of the packets to that thereof to insure packet synchronism of the program multiplexed information 112a, 112b, . . . , 112n, and outputs while the processing speed is being matched.

As described above, by providing a packet synchronizing buffer in the apparatus to synchronizing to packets, it is possible to insure packet synchronism between a plurality of bit streams to be inputted.

Figure 10:
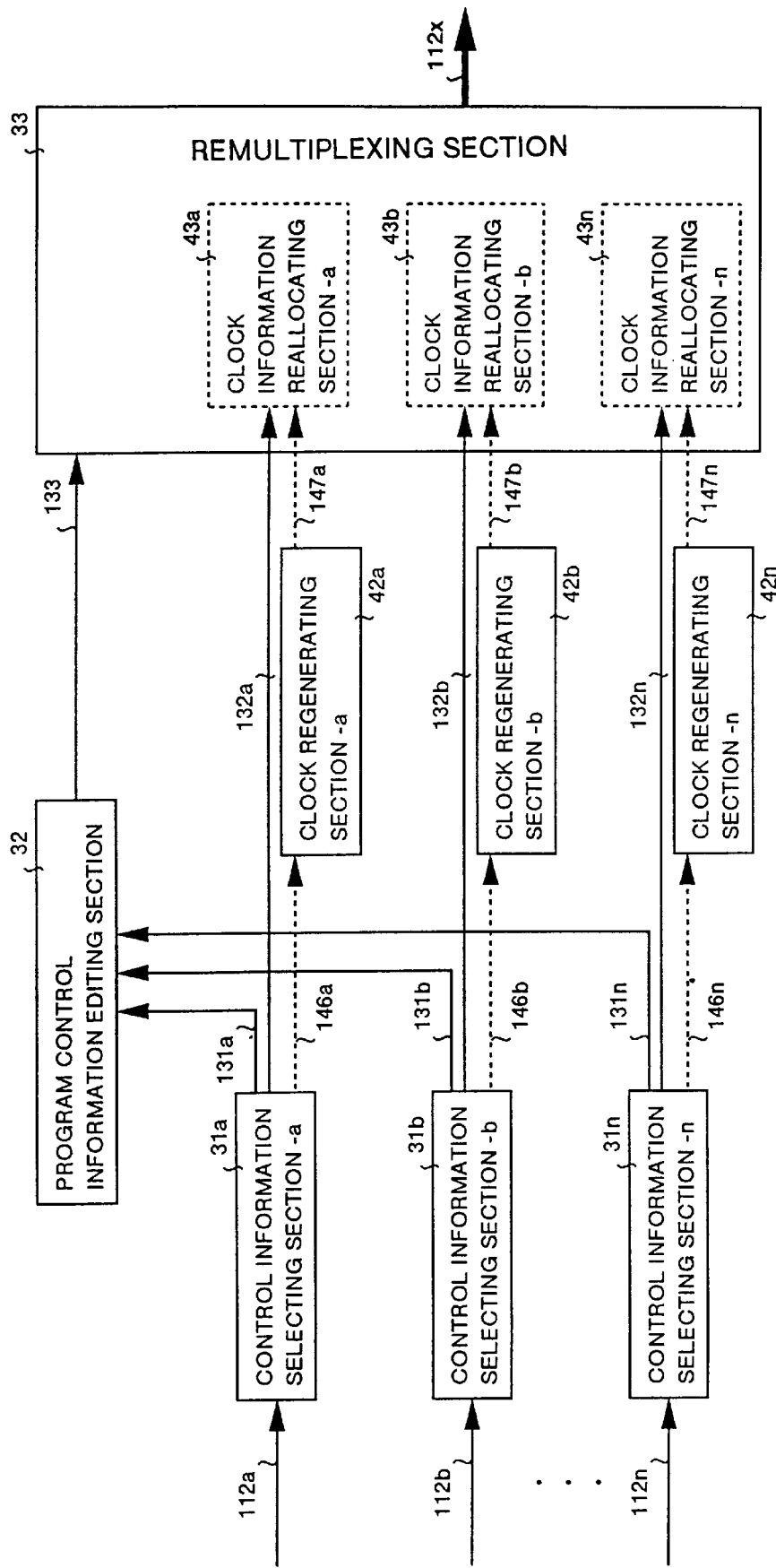
FIG. 10 is a block diagram showing a remultiplexing apparatus according to one of the embodiments of the present invention.

FIG. 10 is a block diagram showing a remultiplexing apparatus according to another embodiment of the present invention.

In FIG. 10, designated at the reference numerals 42a, 42b, . . . , 42n are clock regenerating sections as system clock regenerating means each for regenerating clock information by regenerating a clock according to clock information of each program respectively, at 43a, 43b, . . . , 43n clock information reallocating sections each for generating new clock information and reallocating them, and the same reference numerals are assigned to the sections corresponding to those shown in FIG. 1 excluding the sections described above.

Next description is made for a different point from that in Embodiment 1. At first, description is made for operations in the control information selecting sections 31a, 31b, . . . , 31n with the control information selecting section 31a used as an example.

The control information selecting section 31a takes out all of the program-specific control information from the transmitted program multiplexed information 112a, and obtains PID information for packets containing clock information for all of the programs from all the program-specific control information taken out and stores them.

The control information selecting section 31a, in a case where clock information is contained in the packet with a PID identical to the stored PID information from the transmitted program multiplexed information 112a, takes out only the clock information from the packet, and transfers the clock information to the clock generating section 42a as clock information 146a contained in the media information.

Next description is made for operations in the clock regenerating sections 42a, 42b, . . . , 42n with reference to the clock regenerating section 42a as an example.

Figure 18:
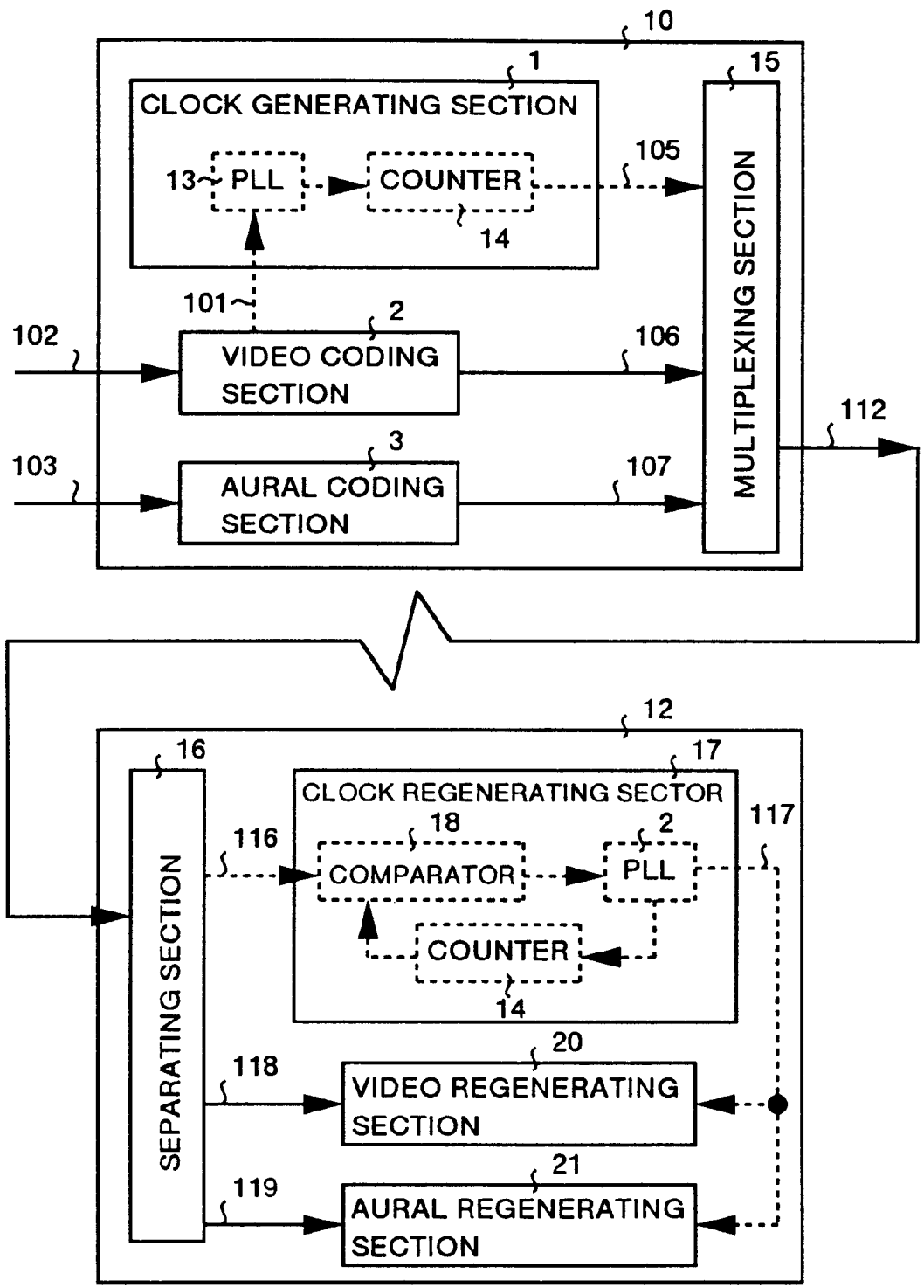
FIG. 18 is an explanatory view showing an outline of clock regeneration.
Figure 19:
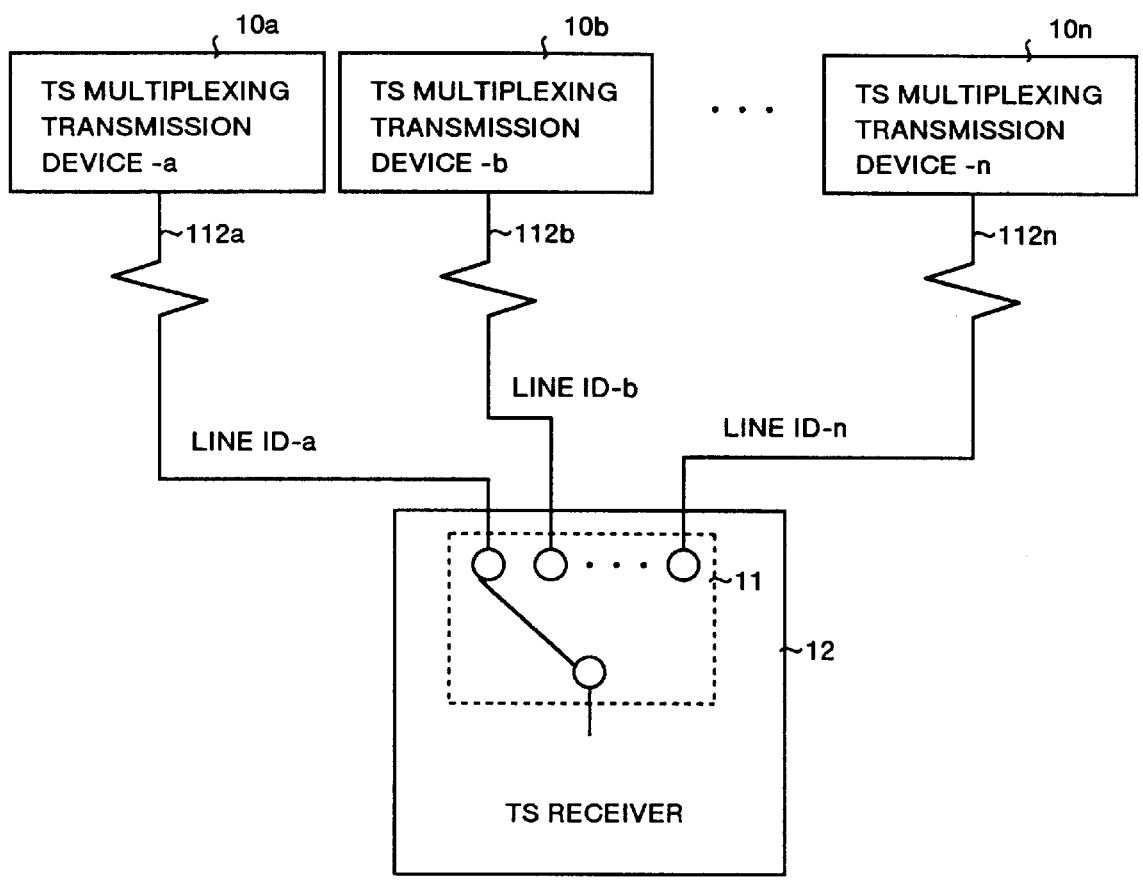
FIG. 19 is a system block diagram showing a plurality of TS multiplexing transmission devices based on the conventional technology.

The clock regenerating sections 42a has the same configuration as that of a clock regenerating section 17 in a method of regenerating a clock shown in FIG. 18, and regenerates a system clock from the clock information for a packet 146a containing clock information transferred from the control information selecting section 31a according to the incorporated PLL.

On the other hand, the clock information reallocating section 43a, in a case where clock information is contained in a packet with a PID identical to the stored PID information from the packet 132a containing media information transferred from the control information selecting section 31a, reallocates the clock information for the packet to clock information 147a generated in the clock regenerating section 42a, and multiplexes the information again in the remultiplexing section 33 for transmission.

As described above, by regenerating a clock from a packet containing program clock information and multiplexing again a packet containing new program clock information generated from the regenerated clock, it is possible to transmit a bit stream containing accurate program clock information.

Next description is made for an example of transmission of the accurate program clock information.

At first, the remultiplexing section 33 takes out PID information for a packet containing clock information for all of the program from the packet containing program-specific control information out of the packet 133 containing new program control information transferred from the program control information editing section 32, and stores the PID information.

Then, in the remultiplexing section 33, when the packets 141a, 141b, . . . , 141n each containing media information transferred from the control information selecting sections 31a, 31b, . . . , 31n are multiplexed again, a delay in multiplication of packets is generated due to an operation for matching an output of other packet. In a case where clock information is present in a transmission-delayed packet, the remultiplexing section 33 computes the delayed time from a number of delayed bytes and an output rate from the transmission path to be outputted, adds the computed delayed time to the clock information, and transmits the packet in which an error of the clock information is corrected.

As described above, the packet containing the program clock information is rewritten to the program clock information in which time fluctuation generated in the process of remultiplication is corrected, and the program clock information included in the bit stream after remultiplication is compensated, so that it is possible to transmit accurate program clock information.

Figure 11:
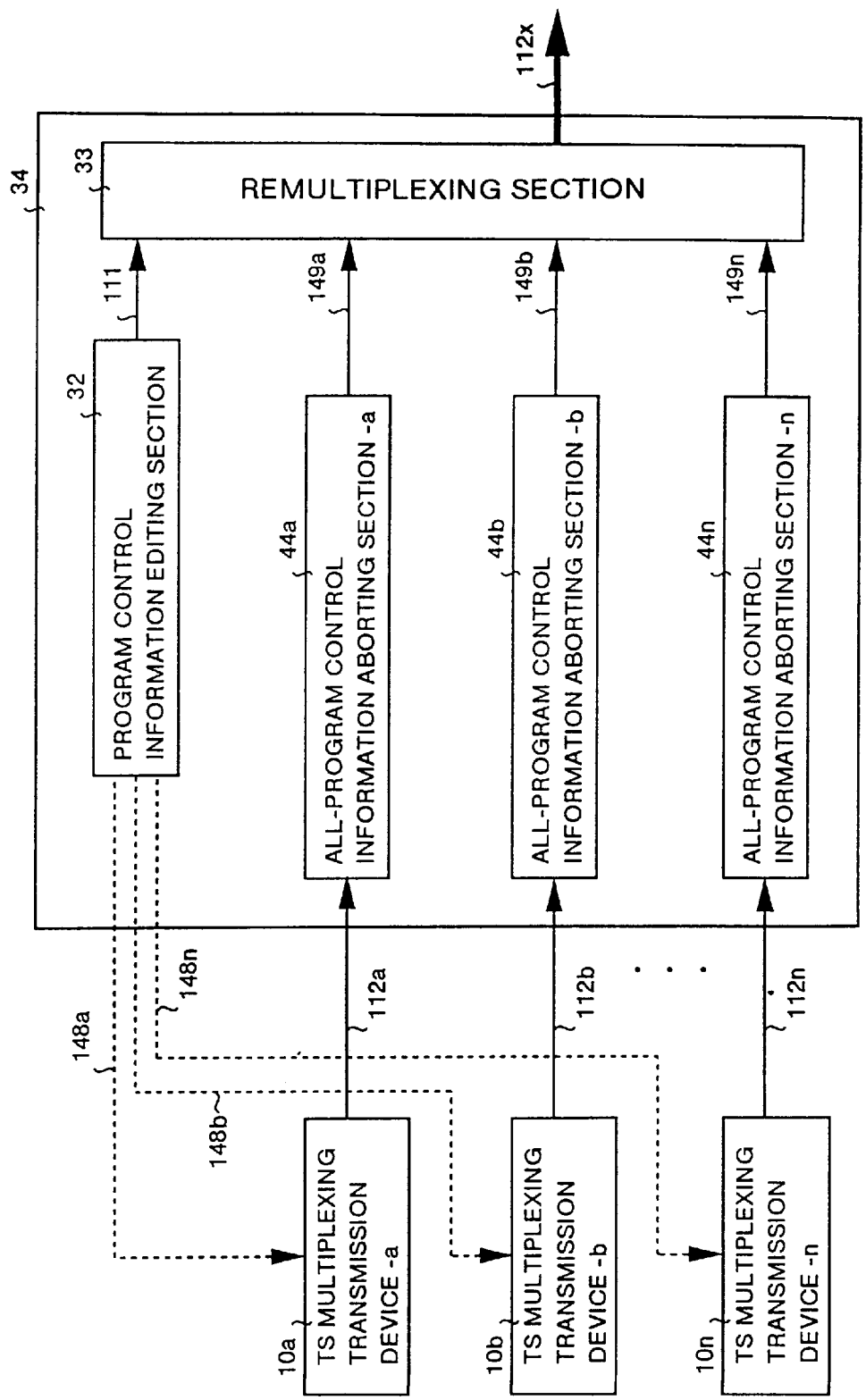
FIG. 11 is a block diagram showing a remultiplexing apparatus according to one of the embodiments of the present invention.

FIG. 11 is a block diagram of a remultiplexing apparatus according to another embodiment of the present invention.

In FIG. 11, designated at the reference numerals 10a, 10b, . . . , 10n are TS multiplexing transmission devices respectively, at 32 the program control information editing section as a program control information editing means, at 33 a remultiplexing section, at 34 a remultiplexing apparatus, and at 44a, 44b, . . . , 44n all program control information aborting sections as all program control information aborting means respectively.

At first, description is made for operations in the program control information editing section 32.

The program control information editing section 32 decides PIDs to be allocated to a packet containing program-specific control information for all programs as well as to a packet containing media information based on information, such as a number of programs and types of media constituting each program or the like, previously given thereto about program multiplexed information 112a, 112b, . . . , 112n each transmitted through the TS multiplexing transmission devices 10a, 10b, . . . , 10n.

The program control information editing section 32 takes out required PID information from the determined PID information to be given to the program-specific control information for all programs as well as to media information therefor, and transmits the information as PID information 148a, 148b, . . . , 148n to the TS multiplexing transmission devices 10a, 10b, . . . , 10n.

The program control information editing section 32 generates a packet containing all program control information with PID-P from the determined PID information to be given to the packet containing program-specific control information for all the programs as well as to the packet containing media information therefor, and transfers the packet 111 containing the generated all program control information with PID-P to the remultiplexing section 33 at prespecified time intervals after the processing of remultiplication of the information has been started in the remultiplexing section 33.

Next description is made for operations in the TS multiplexing transmission devices 10a, 10b, . . . , 10n with the TS multiplexing transmission device 10a used as an example. The TS multiplexing transmission device 10a stores the PID information 148a transmitted from the program control information editing section 32 in the remultiplexing apparatus 34, gives PIDs to a packet containing the program-specific control information for each program as well as to a packet containing media information therefor according to the stored PID information 148a, generates a packet containing all program control information with PID-P , multiplexes the information for transmission.

Next description is made for operations in the all program control information aborting sections 44a, 44b, . . . , 44n with the all program control information aborting section 44a used as an example. The all program control information aborting sections 44a selectively takes out the packet containing the all program control information with PID-P from the program multiplexed information 112a transmitted from the TS multiplexing transmission device 10a and aborts it.

The all program control information aborting sections 44a transfers the remained packets after the packet containing the all program control information with PID-P has been aborted from the program multiplexed information 112a to the remultiplexing section 33 as a packet 149a after abortion of the all program control information therefrom.

Finally, the remultiplexing section 33 multiplexes again the packets 111 containing the all program control information transferred from the program control information editing section 32 and the packets 149a, 149b, . . . , 149n each after abortion of the all program control information transferred from the all program control information aborting sections 44a, 44b, . . . , 44n respectively, and transmits the packet as program multiplexed information 121x.

As described above, by previously instructing an ID number of a packet excluding all program control information to a multiplexing transmission device for generating bit streams to be remultiplexed from the remultiplexing apparatus, the packet containing all program control information is selected and aborted, so that only the remained packets and a packet containing the newly generated all program control information are remultiplexed, which makes it possible to constitute a simple remultiplexing apparatus.

Figure 12:
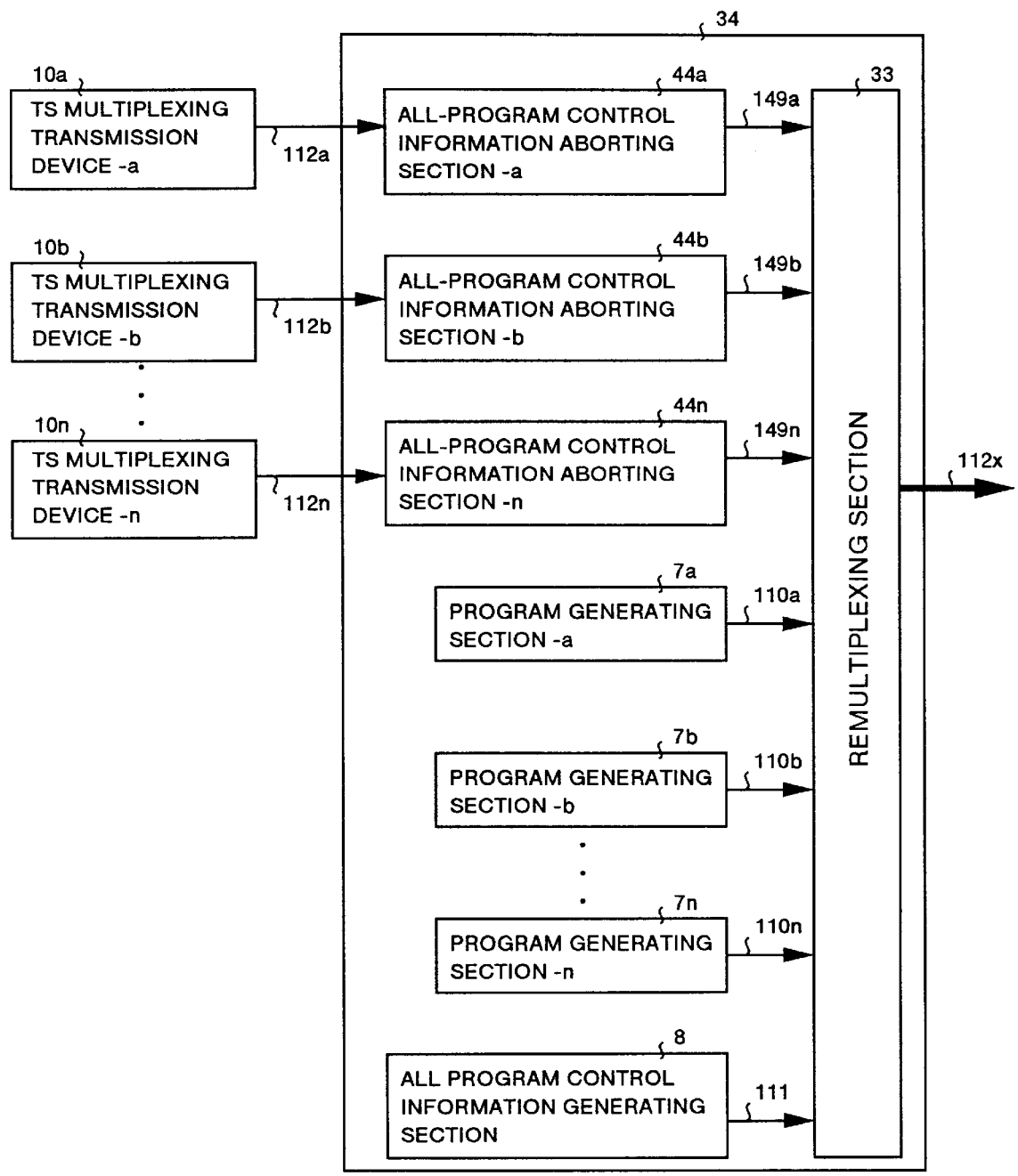
FIG. 12 is a block diagram showing a remultiplexing apparatus according to one of the embodiments of the present invention.
Figure 13:
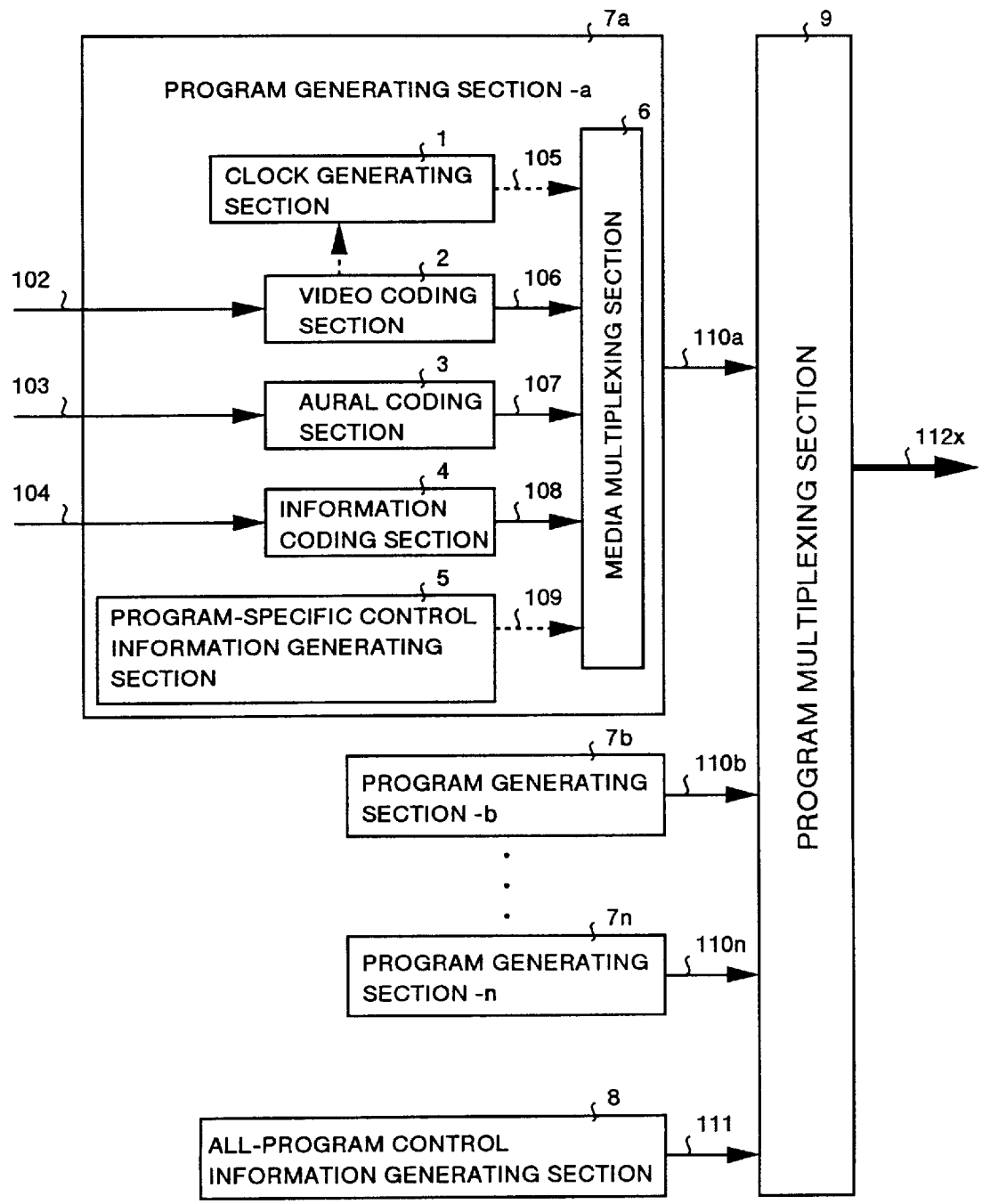
FIG. 13 is a block diagram showing a TS multiplexing transfer apparatus based on the conventional technology.
Figure 14:
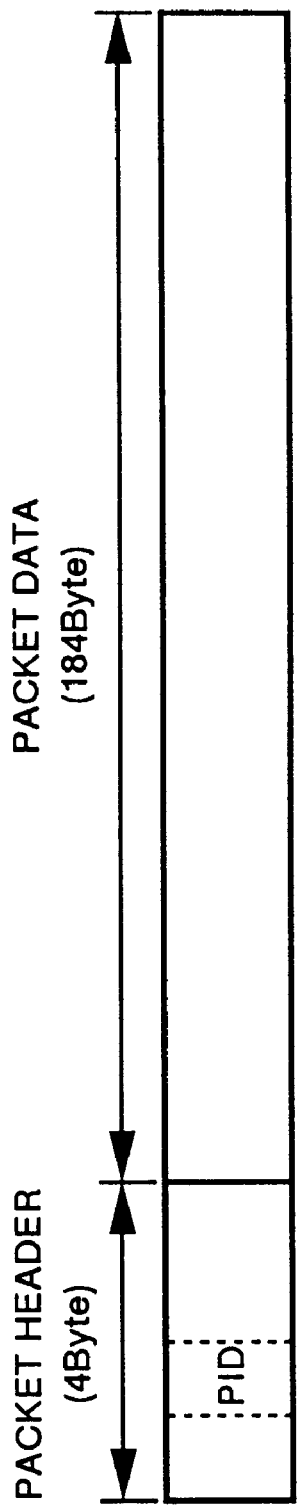
FIG. 14 is an explanatory view showing a packet format of the TS.
Figure 17:
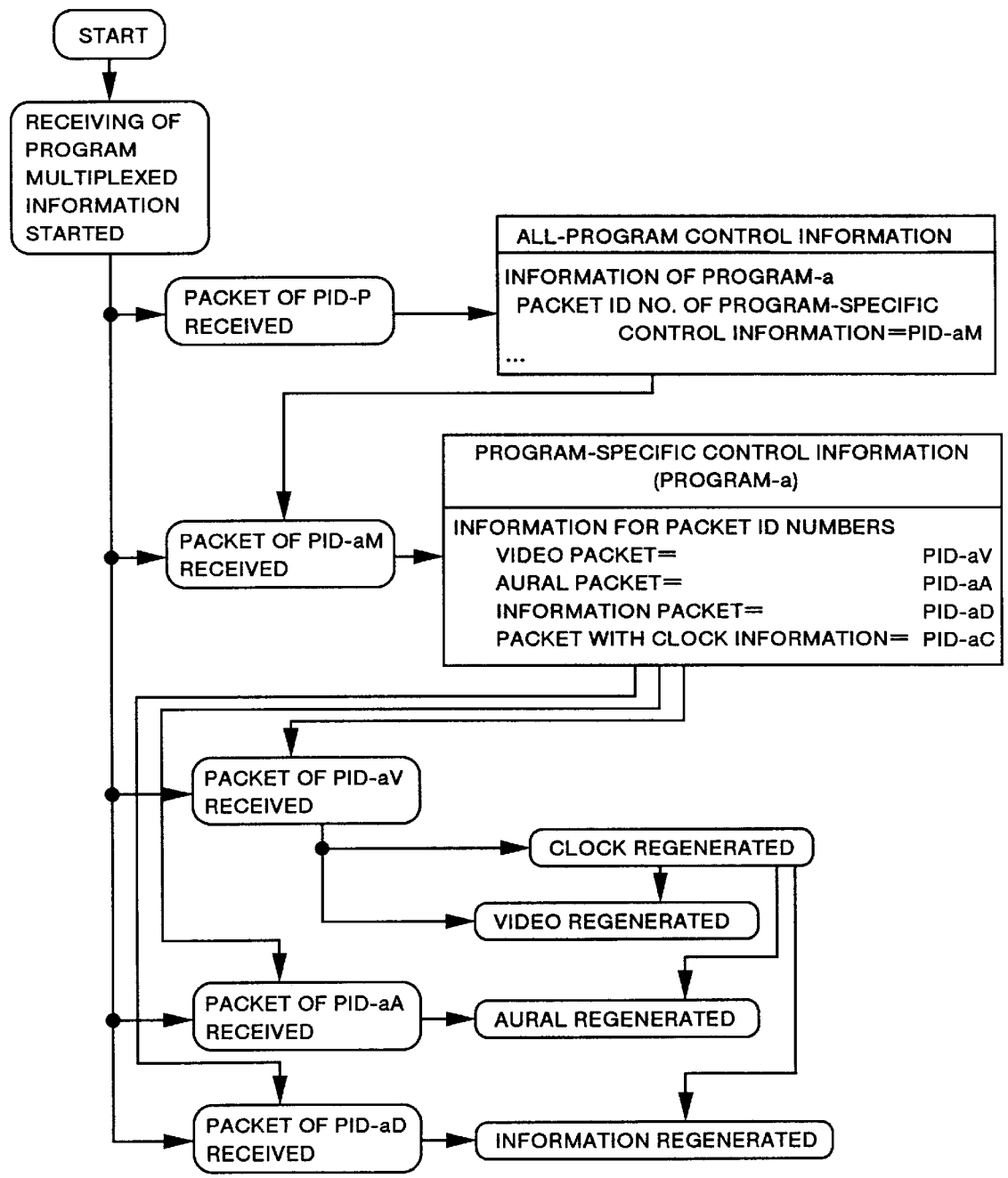
FIG. 17 is a flow chart showing processing of media regeneration in a TS receiver.

FIG. 12 is a block diagram of a remultiplexing apparatus according to another embodiment of the present invention.

In FIG. 12, designated at the reference numerals 7a, 7b, . . . , 7n are program generating sections as program generating means respectively, at 8 an all program control information generating section as an all program control information generating means, at 10a, 10b, . . . , 10n the TS multiplexing transmission devices respectively, at 32 the program control information editing section as a program control information editing means, at 33 the remultiplexing section, at 34 the remultiplexing apparatus, and at 44a, 44b, . . . , 44n the all program control information aborting sections as all program control information aborting means respectively.

Next description is made for operations.

Description is made for operations in the all program control information aborting sections 44a, 44b, . . . , 44n with reference to the all program control information aborting section 44a as an example.

The all program control information aborting sections 44a selectively takes out the packet containing the all program control information with PID-P from the program multiplexed information 112a transmitted from the TS multiplexing transmission device 10a and aborts it.

The all program control information aborting sections 44a transfers the remained packets after the packet containing the all program control information with PID-P has been aborted from the program multiplexed information 112*a* to the remultiplexing section 33 as a packet 149*a* after the all program control information has been aborted therefrom.

Next description is made for operations in the all program control information generating section 8.

The all program control information generating section 8 generates a packet 111 containing a new unit of all program control information to the packets 149*a*, 149*b*, . . . , 149*n* each after abortion of the all program control information transferred from the all program control information aborting sections 44*a*, 44*b*, . . . , 44*n* and to information for one program 110*a*, 110*b*, . . . , 110*n* generated in the program generating sections 7*a*, 7*b*, . . . , 7*n* respectively, and transfers the generated packet to the remultiplexing section 33.

Finally, the remultiplexing section 33 multiplexes again the packets 149*a*, 149*b*, . . . , 149*n* each after abortion of the all program control information transferred from the all program control information aborting sections 44*a*, 44*b*, . . . , 44*n*, information for one program 110*a*, 110*b*, . . . , 110*n* generated in the program generating sections 7*a*, 7*b*, . . . , 7*n* respectively, and the packet 111 containing the new unit of all program control information transferred from the all program control information generating section 8, and transmits the remultiplexed packet as program multiplexed information 121*x*.

As described above, by aborting only all program control information from the bit streams received by the remultiplexing apparatus and only multiplexing again the program information packet from the program generating section and the packet containing the newly generated all program control information, a simple remultiplexing apparatus can be constructed.

It should be noted that each means can be realized with software.

As described above, in the present invention, the remultiplexing apparatus selects a packet containing program control information from a plurality of inputted bit streams, edits contents of the selected program control information to generate new program control information corresponding to a bit stream to be outputted, and multiplies again a packet containing media information in the inputted bit stream and the newly generated program control information to generate a new bit stream, whereby a single bit stream insures a larger number of programs without changing the configuration in the bit stream receiver.

In a case where contents of program control information contained in a plurality of inputted bit streams is updated, contents of program control information to be generated is updated, whereby appropriate program control information and media information can be obtained in the bit stream receiver.

Removing a null packet from inputted packets improves transmission efficiency, which makes it possible to make use of a transmission path effectively.

In a packet containing program clock information, the packet containing program clock information is preferentially remultiplexed and transmitted, whereby an error to the program clock information is kept to a minimum with simple procedures.

In a case where a rate of a remultiplexed bit stream is slower than an output rate, it is possible to match a processing speed to the output rate of an outputted bit stream by inserting a null packet.

In a case where a transmission speed (rate) of a remultiplexed bit stream is slower than an output rate, a processing speed is matched to the output rate of an outputted bit stream by inserting a information packet inputted from an external means to transmit external information, which makes it possible to make use of a transmission path effectively.

It is possible to transmit only a necessary program by remultiplexing only a program selected from program control information contained in an inputted bit stream. Moreover, in such a case where a bit stream generated after remultiplexing all programs contained in all inputted bit streams is faster than a transmission rate in a transmission path, a program is selected and transmitted, which makes it possible to transmit a generated bit rate.

By obtaining viewability restricting information contained in program control information of an inputted bit stream and remultiplexing only a program selected according to the viewability restricting information, only a necessary program can be transmitted.

In a bit stream in which ID numbers of packets each containing media information are reallocated so that the two numbers are not identical, ID numbers of packet each containing media information are reallocated to other number, and the packets each other with the reallocated ID numbers are remultiplexed, one-packet ID number is given to one media information, so that each media information can be obtained discriminately in a bit stream receiving device.

The bit stream is outputted in synchronism to a clock inputted from an external means, whereby synchronism in transmission is easily obtained.

By comprising a packet synchronizing buffer for insuring packet synchronism, packet synchronism between a plurality of inputted bit streams is insured.

By regenerating a clock from a packet containing program clock information and multiplexing again a packet containing new program clock information generated by the regenerated clock, a bit stream containing accurate program clock information is transmitted.

By rewriting a packet containing program clock information to program clock information with time fluctuation generated in remultiplication having been corrected, and compensating program clock information contained in a bit stream after remultiplication, accurate program clock information can be transmitted.

By instructing in advance an ID number for a packet containing information except all program control information to the multiplexing transmission device generating a bit stream to be remultiplexed from the remultiplexing apparatus, a packet containing all program control information is selected to be aborted, and only a remained packet and a packet containing newly generated all program control information are multiplexed again; as a result, a simple remultiplexing apparatus can be constructed.

Moreover, only all program control information is aborted from a bit stream inputted into the remultiplexing apparatus, and only a program information packet from the program generating section and a packet containing newly generated all program control information are multiplexed again, whereby a simple remultiplexing apparatus can be constructed.

This application is based on Japanese patent application No. HEI B-194964 filed in the Japanese Patent Office on Jul. 24, 1996, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A remultiplexing apparatus for remultiplexing a multiplexed input bit stream including a combination of media information packets with packets of program information comprising:

a control information selecting unit which selects packets containing program control information from the multiplexed input bit stream according to packet identification numbers and outputting multiplexed media information packets;

a program control information editing unit which edits contents of the selected program control information packets and generates a modified program control information corresponding to a remultiplexed bit stream to be output; and a remultiplexing unit which remultiplexes the modified program control information with the multiplexed media information packets containing the media information from the multiplexed input bit stream to produce the remultiplexed bit stream;

wherein contents of the program control information generated by said program control information editing unit are selectively updated by checking whether the contents of the program control information contained in the multiplexed input bit stream is updated.

2. The remultiplexing apparatus according to claim 1; wherein ID numbers of packets containing media information are selectively reallocated by said program control information editing unit so that two numbers may not be identical, further comprising an ID number reallocating unit which relocates packet ID numbers according to a result of reallocation performed by said program control information editing unit.

3. The remultiplexing apparatus according to claim 1, wherein said program control information editing unit updates the program control information by checking whether a version information contained in the multiplexed input bit stream is updated.

4. The remultiplexing apparatus according to claim 3, wherein said program control information editing unit skips updating the contents of the modified program control information when the version information is not changed.

5. A remultiplexing apparatus for remultiplexing a multiplexed input bit stream including a combination of media information packets with packets of program information comprising:

a control information selecting unit which selects packets containing program control information from the multiplexed input bit stream according to packet identification numbers and outputting multiplexed media information packets;

a program control information editing unit which edits contents of the selected program control information packets and generates a modified program control information corresponding to a remultiplexed bit stream to be output; and a remultiplexing unit which remultiplexes the modified program control information with the multiplexed media information packets containing the media information from the multiplexed input bit stream to produce the remultiplexed bit stream;

wherein said remultiplexing unit preferentially multiplexes a packet containing program clock information for regenerating a system clock in the receiving side so that error in the program clock information is suppressed.

6. The remultiplexing apparatus according to claim 5, wherein said remultiplexing unit remultiplexes the packet containing program clock information without any change of the program clock information.

7. A remultiplexing apparatus for remultiplexing a multiplexed input bit stream including a combination of media information packets with packets of program information comprising:

a control information selecting unit which selects packets containing program control information from the multiplexed input bit stream according to packet identification numbers and outputting multiplexed media information packets;

a program control information editing unit which edits contents of the selected program control information packets and generates a modified program control information corresponding to a remultiplexed bit stream to be output;

an external information packet inserting unit which packetizes external information; and a remultiplexing unit which remultiplexes the modified program control information with the multiplexed media information packets containing the media information from the multiplexed input bit stream to produce the remultiplexed bit stream, wherein said remultiplexing unit multiplexes a packet containing the external information with the remultiplexed bit stream when the multiplexed bit stream has more space compared with an output rate of said multiplexing unit.

8. The remultiplexing apparatus according to claim 7, wherein said remultiplexing unit determines whether a transmission rate of the remultiplexed bit stream is less than the output rate of the remultiplexing unit, if so, multiplexes the packet containing the external information with the remultiplexed output bit stream.

9. The remultiplexing apparatus according to claim 7, wherein said remultiplexing unit selectively outputs control signal when a transmission rate of the modified program control information and the multiplexed media information packets is slower than an output rate of said remultiplexing unit, and said packetizing unit sends the packet containing the external information in accordance with the control signal.

10. The remultiplexing apparatus according to claim 7, wherein said remultiplexing unit multiplexes the external information by matching a processing speed of insertion of the external information based on the output rate of said remultiplexing unit.

11. A remultiplexing apparatus for remultiplexing a multiplexed input bit stream including a combination of media information packets with packets of program information comprising:

a control information selecting unit which selects packets containing program control information from the multiplexed input bit stream according to packet identification numbers and outputting multiplexed media information packets;

a program organizing unit which selects a plurality of required programs contained in the multiplexed input bit stream in accordance with program type information of each of the programs, the program type information being defined in the program information and representing a type of each of the programs;

a program control information editing unit which edits contents of the selected program control information packets and generates a modified program control information corresponding to a remultiplexed bit stream to be output;

a media information selecting unit which selects specific media information packets belonging to the requited programs from the media information packets; and a remultiplexing unit which remultiplexes the modified program control information with the specific media information packets to produce the remultiplexed output bit stream, while not remultiplexing packets belonging to a program which is not selected by the program organizing unit.

12. The remultiplexing apparatus according to claim 11, wherein said program organizing unit selects the required programs according to viewability restricting information defined as the program type information.

13. The remultiplexing apparatus according to claim 11; wherein said remultiplexing apparatus remultiplexes a plurality of multiplexed streams including said multiplexed input bit stream, said program organizing unit selects the required programs contained in the multiplexed streams and selects some of the packet identification numbers corresponding to the required programs, and said media information selecting unit includes a plurality of selectors, each of said selectors receiving a multiplexed input bit stream respectively and selecting packets belonging to one of the required programs based on one of the packet identification numbers selected by said program organizing unit.

14. The remultiplexing apparatus according to claim 11, wherein contents of the program control information generated by said program control information editing unit is selectively updated by checking whether the contents of the program control information contained in the multiplexed input bit stream is updated.

15. A remultiplexing apparatus for remultiplexing a plurality of multiplexed bit streams each including a combination of media information packets with packets of program information and outputting a remultiplexed bit stream comprising:

a program control information editing unit which provides an ID number for a packet containing program control information to a plurality of multiplexing transmission devices each generating one of the multiplexed bit streams input into the remultiplexing apparatus;

an all program control information aborting unit which aborts only a packet containing all program control information from each of the multiplexed input bit streams and outputting plural streams of multiplexed media information packets; and a remultiplexing unit which remultiplexes the all program control information output from said program control information editing unit with the plural streams of multiplexed media information packets output from said all program control information aborting.

16. A remultiplexing apparatus for remultiplexing a plurality of multiplexed bit streams each including a combination of media information packets with multiplexed packets of program information and outputting a remultiplexed bit stream comprising:

an all program control information aborting unit which aborts only a packet containing an all program control information from each of the multiplexed bit streams input into the remultiplexing apparatus;

a program generating unit which multiplexes media coded information prepared by coding media information as well as program specific control information with fixed-length packets to generate programs;

an all program control information generating unit which generates an all program control information packet; and a remultiplexing unit which remultiplexes an output packet from said all program control information aborting unit, an output packet from said program generating unit, and said all program control information packets.

17. A remultiplexing apparatus for remultiplexing a plurality of multiplexed bit streams each including a combination of media information packets comprising:

a plurality of control information selectors, each operatively connected to a respective input that receives a multiplexed input bit stream previously multiplexed with packets of program control information and media information packets, each of said control information selectors selecting a program control information packet from the respective multiplexed input bit stream and outputting multiplexed media information packets, one of said control information selectors receiving the multiplexed input bit stream from the corresponding input;

a packet synchronizing buffer, operatively connected between one of said control information selectors and the corresponding input, for receiving one of said multiplexed bit streams which are sent at different timing and outputting packets to said connected control information selector with insuring packet synchronism between said multiplexed bit streams;

a program control information editor, operatively connected to said control information selectors, that edits contents of the selected program control information packets and generates a modified program control information packet associated with an output bit stream; and a remultiplexer, operatively connected to said program control information editor and said control information selectors, that remultiplexes the modified program control information packet with the multiplexed media information packets to generate the output bit stream.

18. The remultiplexing apparatus according to claim 17 further comprising: a system clock regenerating unit which regenerates a system clock from a packet containing program clock information included in the multiplexed input bit stream, and keeping time; and a clock information reallocating unit which rewrites the program clock information with new clock information generated from the system clock kept at the time of remultiplexing, by said system clock regenerating unit.

19. A remultiplexing apparatus for remultiplexing a plurality of multiplexed input bit streams each including a combination of media information packets comprising:

a program control information editor, operatively connected to an input, said program control information editor outputs an identification number for a packet containing program control information to a plurality of multiplexing transmission devices each generating one of the plurality of multiplexed input bit streams;

an all program control information aborter, operatively connected to said program control information editor that selectively aborts only a packet containing all program control information from each of the plurality of multiplexed input bit streams and outputting plural streams of multiplexed media information packets; and a remultiplexer, operatively connected to said all program information aborter and said program control information editor, that remultiplexes the output from said program control information editor with the plural streams of multiplexed media information packets.

20. A remultiplexing apparatus for remultiplexing a plurality of input bit streams each including a combination of media information packets comprising:

an all program control information aborter, operatively connected to an input, said all program control information aborter aborts only a packet containing an all program control information from each of the multiplexed input bit streams;

a program generator, operatively connected to said all program control information aborter, said program generator multiplexing media coded information as well as program specific information to generate programs; and a remultiplexer, operatively connected to said all program control information aborter and said program generator that remultiplexes an output packet from said all program control information aborter, an output packet from said program generator, and an all program control information packet.

* * * * *